US011619278B2

(12) United States Patent
Galasso et al.

(10) Patent No.: US 11,619,278 B2
(45) Date of Patent: *Apr. 4, 2023

(54) METHODS AND APPARATUS FOR SUSPENSION ADJUSTMENT

(71) Applicant: Fox Factory, Inc., Duluth, GA (US)

(72) Inventors: Mario Galasso, Sandy Hook, CT (US); Joseph Franklin, Vancouver, WA (US); Andrew Laird, Los Gatos, CA (US); Robert C. Fox, Los Gatos, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/043,826

(22) Filed: Jul. 24, 2018

(65) Prior Publication Data

US 2018/0328442 A1  Nov. 15, 2018

Related U.S. Application Data

(63) Continuation of application No. 13/022,346, filed on Feb. 7, 2011, now Pat. No. 10,036,443, which is a
(Continued)

(51) Int. Cl.
*F16F 9/32* (2006.01)
*B62K 25/04* (2006.01)
*B62K 25/28* (2006.01)

(52) U.S. Cl.
CPC ............ *F16F 9/3264* (2013.01); *B62K 25/04* (2013.01); *B62K 25/286* (2013.01); *F16F 2228/08* (2013.01)

(58) Field of Classification Search
CPC ........ F16F 9/50; F16F 9/3264; F16F 2228/08; B62K 25/286; B62K 25/04
See application file for complete search history.

(56) References Cited

U.S. PATENT DOCUMENTS 435,995 A    9/1890   Dunlop
1,492,731 A   5/1924   Kerr
(Continued)

FOREIGN PATENT DOCUMENTS

DE     1555311 A1    8/1970
DE     3613386 A1   10/1986
(Continued)

OTHER PUBLICATIONS

U.S. Appl. No. 61/175,422, filed May 4, 2009, Mario Galasso et al., 17 Pages.
(Continued)

*Primary Examiner* — Robert A. Siconolfi
*Assistant Examiner* — James K Hsiao

(57) ABSTRACT

Methods and apparatus of a system for vehicles comprising a vehicle suspension, a sensor operable to measure an operational characteristic of the vehicle suspension, and a processor in communication with the sensor that is operable to suggest an operational setting of the vehicle suspension in response to an input from the sensor corresponding to the operational characteristic. A method for adjusting a suspension of a vehicle may comprise receiving suspension data with a processor, calculating a suspension setting suggestion with the processor, communicating the suspension setting suggestion to a user interface device, and adjusting the suspension based on the suspension setting suggestion.

18 Claims, 10 Drawing Sheets

Related U.S. Application Data continuation-in-part of application No. 12/773,671, filed on May 4, 2010, now abandoned, and a continuation-in-part of application No. 12/727,915, filed on Mar. 19, 2010, now Pat. No. 9,140,325.

(60) Provisional application No. 61/302,070, filed on Feb. 5, 2010, provisional application No. 61/175,422, filed on May 4, 2009, provisional application No. 61/161,552, filed on Mar. 19, 2009, provisional application No. 61/161,620, filed on Mar. 19, 2009.

(56) References Cited

U.S. PATENT DOCUMENTS

| | | |
|---|---|---|
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 1,970,239 A | 8/1934 | Klaas |
| 2,018,312 A | 10/1935 | Moulton |
| 2,098,119 A | 11/1937 | White |
| 2,115,072 A | 4/1938 | Hunt et al. |
| 2,122,407 A | 7/1938 | Chisholm |
| 2,186,266 A | 1/1940 | Henry |
| 2,259,437 A | 10/1941 | Dean |
| 2,492,331 A | 12/1949 | Spring |
| 2,540,525 A | 2/1951 | Howarth et al. |
| 2,559,633 A | 7/1951 | Maurice et al. |
| 2,588,520 A | 3/1952 | Halgren et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,778,378 A | 1/1957 | Presnell |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,879,971 A | 3/1959 | Demay |
| 2,883,181 A | 4/1959 | Hogan et al. |
| 2,897,613 A | 8/1959 | Davidson et al. |
| 2,941,629 A | 6/1960 | Etienne et al. |
| 2,967,065 A | 1/1961 | Schwendner |
| 2,991,804 A | 7/1961 | Merkle |
| 3,003,595 A | 10/1961 | Patriquin et al. |
| 3,056,598 A | 10/1962 | Sutton et al. |
| 3,071,394 A | 1/1963 | John |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,202,413 A | 8/1965 | Colmerauer |
| 3,206,153 A | 9/1965 | Burke |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,528,700 A | 9/1970 | Janu et al. |
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,618,972 A | 11/1971 | Buhl |
| 3,621,950 A | 11/1971 | Lutz |
| 3,650,033 A | 3/1972 | Behne et al. |
| 3,701,544 A | 10/1972 | Stankovich |
| 3,714,953 A | 2/1973 | Solvang |
| 3,750,856 A | 8/1973 | Kenworthy et al. |
| 3,784,228 A | 1/1974 | Hoffmann et al. |
| 3,791,408 A | 2/1974 | Saitou et al. |
| 3,830,482 A | 8/1974 | Norris |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Yankowski et al. |
| 3,981,204 A | 9/1976 | Starbard et al. |
| 3,981,479 A | 9/1976 | Foster et al. |
| 3,986,118 A | 10/1976 | Madigan |
| 3,995,883 A | 12/1976 | Glaze |
| 4,007,855 A | 2/1977 | Hierath et al. |
| 4,022,113 A | 5/1977 | Blatt et al. |
| 4,032,829 A | 6/1977 | Schenavar et al. |
| 4,036,335 A | 7/1977 | Thompson et al. |
| 4,072,087 A | 2/1978 | Mueller et al. |
| 4,103,881 A | 8/1978 | Simich |
| 4,106,522 A | 8/1978 | Manesse |
| 4,114,735 A | 9/1978 | Kato |
| 4,121,610 A | 10/1978 | Harms et al. |
| 4,131,657 A | 12/1978 | Ball et al. |
| 4,139,186 A | 2/1979 | Postema et al. |
| 4,153,237 A | 5/1979 | Supalla |
| 4,159,106 A | 6/1979 | Nyman et al. |
| 4,174,098 A | 11/1979 | Baker et al. |
| 4,183,509 A | 1/1980 | Nishikawa et al. |
| 4,236,613 A | 12/1980 | Van Der Lely |
| 4,287,812 A | 9/1981 | Iizumi |
| 4,291,850 A | 9/1981 | Sharples |
| 4,305,566 A | 12/1981 | Grawunde |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Koshida |
| 4,366,969 A | 1/1983 | Benya et al. |
| 4,387,781 A | 6/1983 | Ezell et al. |
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Woelfges |
| 4,550,899 A | 11/1985 | Holley |
| 4,570,851 A | 2/1986 | Cirillo et al. |
| 4,572,317 A | 2/1986 | Isono et al. |
| 4,616,810 A | 10/1986 | Richardson et al. |
| 4,620,619 A | 11/1986 | Emura et al. |
| 4,624,346 A | 11/1986 | Katz et al. |
| 4,630,818 A | 12/1986 | Saarinen |
| 4,634,142 A | 1/1987 | Woods et al. |
| 4,647,068 A | 3/1987 | Asami et al. |
| 4,655,440 A | 4/1987 | Eckert |
| 4,657,280 A | 4/1987 | Ohmori |
| 4,659,104 A | 4/1987 | Tanaka et al. |
| 4,660,689 A | 4/1987 | Hayashi et al. |
| 4,662,616 A | 5/1987 | Hennells |
| 4,673,194 A | 6/1987 | Sugasawa |
| 4,696,489 A | 9/1987 | Fujishiro et al. |
| 4,709,779 A | 12/1987 | Takehara |
| 4,723,753 A | 2/1988 | Torimoto et al. |
| 4,729,459 A | 3/1988 | Inagaki et al. |
| 4,732,244 A | 3/1988 | Verkuylen |
| 4,743,000 A | 5/1988 | Karnopp |
| 4,744,444 A | 5/1988 | Gillingham |
| 4,750,735 A | 6/1988 | Furgerson et al. |
| 4,765,648 A | 8/1988 | Mander et al. |
| 4,773,671 A | 9/1988 | Inagaki |
| 4,786,034 A | 11/1988 | Heess et al. |
| 4,802,561 A | 2/1989 | Knecht et al. |
| 4,806,082 A | 2/1989 | Schenk |
| 4,815,575 A | 3/1989 | Murty et al. |
| 4,821,852 A | 4/1989 | Yokoya |
| 4,826,207 A | 5/1989 | Yoshioka et al. |
| 4,830,395 A | 5/1989 | Foley |
| 4,836,578 A | 6/1989 | Soltis |
| 4,838,306 A | 6/1989 | Horn et al. |

(56) References Cited

U.S. PATENT DOCUMENTS

| | | |
|---|---|---|
| 4,838,394 A | 6/1989 | Lemme et al. |
| 4,838,527 A | 6/1989 | Holley |
| 4,846,317 A | 7/1989 | Hudgens |
| 4,858,733 A | 8/1989 | Noguchi et al. |
| 4,892,328 A | 1/1990 | Kurtzman et al. |
| 4,919,166 A | 4/1990 | Sims et al. |
| 4,936,423 A | 6/1990 | Karnopp |
| 4,936,424 A | 6/1990 | Costa |
| 4,938,228 A | 7/1990 | Righter |
| 4,949,262 A | 8/1990 | Buma et al. |
| 4,949,989 A | 8/1990 | Kakizaki et al. |
| 4,958,706 A | 9/1990 | Richardson et al. |
| 4,975,849 A | 12/1990 | Ema et al. |
| 4,984,819 A | 1/1991 | Kakizaki et al. |
| 4,986,393 A | 1/1991 | Preukschat et al. |
| 5,027,303 A | 6/1991 | Witte |
| 5,031,455 A | 7/1991 | Cline |
| 5,036,934 A | 8/1991 | Nishina et al. |
| 5,040,381 A | 8/1991 | Hazen |
| 5,044,614 A | 9/1991 | Rau |
| 5,060,910 A | 10/1991 | Iwata et al. |
| 5,060,959 A | 10/1991 | Davis et al. |
| 5,072,812 A | 12/1991 | Imaizumi |
| 5,074,624 A | 12/1991 | Stauble et al. |
| 5,076,404 A | 12/1991 | Gustafsson |
| 5,080,392 A | 1/1992 | Bazergui |
| 5,094,325 A | 3/1992 | Smith |
| 5,105,918 A | 4/1992 | Hagiwara et al. |
| 5,113,980 A | 5/1992 | Furrer et al. |
| 5,152,547 A | 10/1992 | Davis |
| 5,161,653 A | 11/1992 | Hare |
| 5,161,817 A | 11/1992 | Daum et al. |
| 5,163,742 A | 11/1992 | Topfer et al. |
| 5,178,242 A | 1/1993 | Nakamura et al. |
| 5,186,481 A | 2/1993 | Turner |
| 5,203,584 A | 4/1993 | Butsuen et al. |
| 5,207,774 A | 5/1993 | Wolfe et al. |
| 5,230,364 A | 7/1993 | Leng et al. |
| 5,231,583 A | 7/1993 | Lizell |
| 5,236,169 A | 8/1993 | Johnsen et al. |
| 5,246,247 A | 9/1993 | Runkel |
| 5,248,014 A | 9/1993 | Ashiba |
| 5,259,487 A | 11/1993 | Petek et al. |
| 5,263,559 A | 11/1993 | Mettner |
| 5,265,902 A | 11/1993 | Lewis |
| 5,266,065 A | 11/1993 | Ancarani |
| 5,275,086 A | 1/1994 | Stallings, Jr. |
| 5,277,283 A | 1/1994 | Yamaoka et al. |
| 5,283,733 A | 2/1994 | Colley |
| 5,284,330 A | 2/1994 | Carlson et al. |
| 5,293,971 A | 3/1994 | Kanari |
| 5,295,074 A | 3/1994 | Williams |
| 5,295,563 A | 3/1994 | Bennett |
| 5,295,916 A | 3/1994 | Chattin |
| 5,297,045 A | 3/1994 | Williams et al. |
| 5,301,776 A | 4/1994 | Beck |
| 5,307,907 A | 5/1994 | Nakamura et al. |
| 5,311,709 A | 5/1994 | Kobori et al. |
| 5,318,066 A | 6/1994 | Burgorf et al. |
| 5,328,004 A | 7/1994 | Fannin et al. |
| 5,346,242 A | 9/1994 | Karnopp |
| 5,347,186 A | 9/1994 | Konotchick et al. |
| 5,348,112 A | 9/1994 | Vaillancourt |
| 5,372,223 A | 12/1994 | Dekock et al. |
| 5,372,224 A | 12/1994 | Samonil et al. |
| 5,381,952 A | 1/1995 | Duprez |
| 5,390,121 A | 2/1995 | Wolfe |
| 5,390,949 A | 2/1995 | Naganathan et al. |
| 5,392,885 A | 2/1995 | Patzenhauer et al. |
| 5,392,886 A | 2/1995 | Drummond |
| 5,396,973 A | 3/1995 | Schwemmer et al. |
| 5,398,787 A | 3/1995 | Woessner et al. |
| 5,413,196 A | 5/1995 | Forster |
| 5,467,280 A | 11/1995 | Kimura |
| 5,474,454 A | 12/1995 | Knapp et al. |
| 5,475,593 A | 12/1995 | Townend |
| 5,480,011 A | 1/1996 | Nagai et al. |
| 5,485,417 A | 1/1996 | Wolf et al. |
| 5,487,006 A | 1/1996 | Kakizaki et al. |
| 5,503,258 A | 4/1996 | Clarke et al. |
| 5,542,150 A | 8/1996 | Tu |
| 5,551,674 A | 9/1996 | Johnsen |
| 5,553,836 A | 9/1996 | Ericson |
| 5,578,877 A | 11/1996 | Tiemann |
| 5,586,637 A | 12/1996 | Aidlin et al. |
| 5,588,510 A | 12/1996 | Wilke |
| 5,592,401 A | 1/1997 | Kramer |
| 5,597,180 A | 1/1997 | Ganzel et al. |
| 5,598,337 A | 1/1997 | Butsuen et al. |
| 5,599,244 A | 2/1997 | Ethington |
| 5,601,164 A | 2/1997 | Ohsaki et al. |
| 5,611,413 A | 3/1997 | Feigel |
| 5,651,433 A | 7/1997 | Wirth et al. |
| 5,657,840 A | 8/1997 | Lizell |
| 5,687,575 A | 11/1997 | Keville et al. |
| 5,697,477 A | 12/1997 | Hiramoto et al. |
| 5,699,885 A | 12/1997 | Forster |
| 5,722,645 A | 3/1998 | Reitter |
| 5,735,372 A | 4/1998 | Hamilton et al. |
| 5,803,443 A | 9/1998 | Chang |
| 5,806,159 A | 9/1998 | Inoue et al. |
| 5,810,128 A | 9/1998 | Eriksson et al. |
| 5,810,384 A | 9/1998 | Iwasaki et al. |
| 5,813,456 A | 9/1998 | Milner et al. |
| 5,813,731 A | 9/1998 | Newman et al. |
| 5,816,281 A | 10/1998 | Mixon |
| 5,818,132 A | 10/1998 | Konotchick et al. |
| 5,826,935 A | 10/1998 | Defreitas et al. |
| 5,828,843 A | 10/1998 | Samuel et al. |
| 5,829,733 A | 11/1998 | Becker |
| 5,850,352 A | 12/1998 | Moezzi et al. |
| 5,850,896 A | 12/1998 | Tanaka |
| 5,853,071 A | 12/1998 | Robinson |
| 5,872,418 A | 2/1999 | Wischnewskiy |
| 5,884,921 A | 3/1999 | Katsuda et al. |
| 5,937,975 A | 8/1999 | Forster |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O''Callaghan |
| 5,957,252 A | 9/1999 | Berthold |
| 5,971,116 A | 10/1999 | Franklin |
| 5,987,368 A | 11/1999 | Kamimae et al. |
| 5,988,332 A | 11/1999 | Marzocchi et al. |
| 5,988,655 A | 11/1999 | Sakai et al. |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,013,007 A | 1/2000 | Root et al. |
| 6,017,047 A | 1/2000 | Hoose |
| 6,035,979 A | 3/2000 | Foerster |
| 6,050,583 A | 4/2000 | Bohn |
| 6,058,340 A | 5/2000 | Uchiyama et al. |
| 6,067,490 A | 5/2000 | Ichimaru et al. |
| 6,073,536 A | 6/2000 | Campbell |
| 6,073,700 A | 6/2000 | Tsuji et al. |
| 6,073,736 A | 6/2000 | Franklin |
| 6,092,011 A | 7/2000 | Hiramoto et al. |
| 6,092,816 A | 7/2000 | Sekine et al. |
| 6,105,988 A | 8/2000 | Turner et al. |
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,152,856 A | 11/2000 | Studor et al. |
| 6,157,103 A | 12/2000 | Ohta et al. |
| 6,179,098 B1 | 1/2001 | Hayakawa et al. |
| 6,196,555 B1 | 3/2001 | Gaibler |
| 6,199,669 B1 | 3/2001 | Huang et al. |
| 6,203,026 B1 | 3/2001 | Jones |
| 6,213,263 B1 | 4/2001 | De Frenne |
| 6,215,217 B1 | 4/2001 | Kurosawa et al. |

(56) References Cited

U.S. PATENT DOCUMENTS

| | | |
|---|---|---|
| 6,217,049 B1 | 4/2001 | Becker |
| 6,219,045 B1 | 4/2001 | Leahy et al. |
| 6,244,398 B1 | 6/2001 | Girvin et al. |
| 6,254,067 B1 | 7/2001 | Yih |
| 6,279,702 B1 | 8/2001 | Koh |
| 6,283,462 B1 | 9/2001 | Emmert |
| 6,290,034 B1 | 9/2001 | Ichimaru |
| 6,293,530 B1 | 9/2001 | Delorenzis et al. |
| 6,296,092 B1 | 10/2001 | Marking et al. |
| 6,311,962 B1 | 11/2001 | Marking |
| 6,318,525 B1 | 11/2001 | Vignocchi et al. |
| 6,321,888 B1 | 11/2001 | Reybrouck et al. |
| 6,322,468 B1 | 11/2001 | Wing et al. |
| 6,336,648 B1 | 1/2002 | Bohn |
| 6,343,807 B1 | 2/2002 | Rathbun |
| 6,359,837 B1 | 3/2002 | Tsukamoto et al. |
| 6,360,857 B1 | 3/2002 | Fox et al. |
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1 | 5/2002 | Girvin |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1 | 7/2002 | Spivey et al. |
| 6,427,812 B2 | 8/2002 | Crawley et al. |
| 6,431,573 B1 | 8/2002 | Lerman et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,460,567 B1 | 10/2002 | Hansen et al. |
| 6,467,593 B1 | 10/2002 | Corradini et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordaninejad et al. |
| 6,520,297 B1 | 2/2003 | Lumpkin et al. |
| 6,527,093 B2 | 3/2003 | Oliver et al. |
| 6,592,136 B2 | 7/2003 | Becker et al. |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |
| 6,651,788 B1 | 11/2003 | Wohlfarth |
| 6,659,240 B2 | 12/2003 | Dernebo |
| 6,659,241 B2 | 12/2003 | Sendrea |
| 6,672,687 B2 | 1/2004 | Nishio |
| 6,676,119 B2 | 1/2004 | Becker et al. |
| 6,691,991 B1 | 2/2004 | Huang |
| 6,701,234 B1 | 3/2004 | Vogelsang et al. |
| 6,732,033 B2 | 5/2004 | Laplante et al. |
| 6,755,113 B2 | 6/2004 | Shih |
| 6,782,980 B2 | 8/2004 | Nakadate |
| 6,817,454 B2 | 11/2004 | Nezu et al. |
| 6,827,184 B1 | 12/2004 | Lin |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,902,513 B1 | 6/2005 | McClure et al. |
| 6,905,203 B2 | 6/2005 | Kremers et al. |
| 6,920,951 B2 | 7/2005 | Song et al. |
| 6,921,351 B1 | 7/2005 | Hickman et al. |
| 6,923,853 B2 | 8/2005 | Kremers et al. |
| 6,931,958 B2 | 8/2005 | Takeda |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | McAndrews |
| 7,025,367 B2 | 4/2006 | McKinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kuhnel |
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,207,912 B2 | 4/2007 | Takeda et al. |
| 7,208,845 B2 | 4/2007 | Schaefer et al. |
| 7,217,224 B2 | 5/2007 | Thomas |
| 7,234,574 B2 | 6/2007 | Matsunaga et al. |
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | McAndrews |
| 7,287,760 B1 | 10/2007 | Quick et al. |
| 7,288,038 B2 | 10/2007 | Takeda et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | Laplante et al. |
| 7,302,961 B2 | 12/2007 | Martin et al. |
| 7,306,206 B2 | 12/2007 | Turner |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,373,232 B2 | 5/2008 | Guderzo |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,628,414 B2 | 12/2009 | Dobson et al. |
| 7,631,882 B2 | 12/2009 | Hirao et al. |
| 7,654,369 B2 | 2/2010 | Murray et al. |
| 7,673,936 B2 | 3/2010 | Hsu |
| 7,684,911 B2 | 3/2010 | Seifert et al. |
| 7,694,785 B2 | 4/2010 | Nakadate |
| 7,694,987 B2 | 4/2010 | McAndrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,828,125 B2 | 11/2010 | Sekiya et al. |
| 7,828,126 B2 | 11/2010 | Lun |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |

(56) References Cited

U.S. PATENT DOCUMENTS

| | | |
|---|---|---|
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedetto et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,157,629 B2 | 4/2012 | Yanke et al. |
| 8,191,964 B2 | 6/2012 | Hsu et al. |
| 8,201,476 B2 | 6/2012 | Tsumiyama |
| 8,205,864 B2 | 6/2012 | Michel |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Thomas |
| 8,265,825 B2 | 9/2012 | Kajino et al. |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,328,454 B2 | 12/2012 | McAndrews et al. |
| 8,336,683 B2 | 12/2012 | McAndrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,459,619 B2 | 6/2013 | Trinh et al. |
| 8,480,064 B2 | 7/2013 | Talavasek |
| 8,495,947 B2 | 7/2013 | Hata |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,622,180 B2 | 1/2014 | Wootten et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,684,367 B2 | 4/2014 | Haugen |
| 8,727,947 B2 | 5/2014 | Tagliabue |
| 8,744,699 B2 | 6/2014 | Hamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 * | 7/2014 | Ichida .................... B62J 99/00 701/37 |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,909,424 B2 | 12/2014 | Jordan et al. |
| 8,935,036 B1 | 1/2015 | Christensen et al. |
| 8,936,139 B2 | 1/2015 | Franklin et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,985,594 B2 | 3/2015 | Yabumoto |
| 8,991,571 B2 | 3/2015 | Murakami |
| 9,033,122 B2 | 5/2015 | Ericksen et al. |
| 9,038,791 B2 | 5/2015 | Marking |
| 9,047,778 B1 | 6/2015 | Cazanas et al. |
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,229,712 B2 | 1/2016 | Takamoto et al. |
| 9,239,090 B2 | 1/2016 | Marking et al. |
| 9,278,598 B2 | 3/2016 | Galasso et al. |
| 9,353,818 B2 | 5/2016 | Marking |
| 9,366,307 B2 | 6/2016 | Marking |
| 9,415,659 B2 | 8/2016 | Kikuchi et al. |
| 9,422,018 B2 | 8/2016 | Pelot et al. |
| 9,452,654 B2 | 9/2016 | Ericksen et al. |
| 9,523,406 B2 | 12/2016 | Galasso et al. |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2 | 5/2017 | Ericksen et al. |
| 9,682,604 B2 | 6/2017 | Cox et al. |
| 9,784,333 B2 | 10/2017 | Marking |
| 9,810,282 B2 | 11/2017 | Roessle et al. |
| 9,975,598 B2 | 5/2018 | Bender et al. |
| 10,036,443 B2 | 7/2018 | Galasso et al. |
| 10,040,329 B2 | 8/2018 | Ericksen et al. |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,145,435 B2 | 12/2018 | Galasso et al. |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,406,883 B2 | 9/2019 | Marking |
| 10,415,662 B2 | 9/2019 | Marking |
| 10,443,671 B2 | 10/2019 | Marking |
| 10,473,179 B2 | 11/2019 | Ripa |
| 10,550,909 B2 | 2/2020 | Haugen |
| 10,591,015 B2 | 3/2020 | Galasso et al. |
| 10,604,207 B2 | 3/2020 | Winefordner et al. |
| 10,697,514 B2 | 6/2020 | Marking |
| 10,718,397 B2 | 7/2020 | Marking |
| 10,737,546 B2 | 8/2020 | Tong |
| 10,933,709 B2 | 3/2021 | Shaw et al. |
| 11,162,555 B2 | 11/2021 | Haugen |
| 11,279,198 B2 | 3/2022 | Marking |
| 11,472,252 B2 | 10/2022 | Tong |
| 11,473,644 B2 | 10/2022 | Hansson |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |

(56) References Cited

U.S. PATENT DOCUMENTS

| | | |
|---|---|---|
| 2002/0050112 A1 | 5/2002 | Koch et al. |
| 2002/0050518 A1 | 5/2002 | Roustaei |
| 2002/0055422 A1 | 5/2002 | Airmet et al. |
| 2002/0063469 A1 | 5/2002 | Nishio |
| 2002/0089107 A1 | 7/2002 | Koh |
| 2002/0095979 A1 | 7/2002 | Shirato et al. |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0180166 A1 | 12/2002 | Voss |
| 2002/0185581 A1 | 12/2002 | Trask et al. |
| 2002/0187867 A1 | 12/2002 | Ichida et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |
| 2003/0040348 A1 | 2/2003 | Martens et al. |
| 2003/0051954 A1 | 3/2003 | Sendrea |
| 2003/0054327 A1 | 3/2003 | Evensen et al. |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1* | 8/2003 | LaPlante ............... B60G 17/08 267/136 |
| 2003/0191567 A1 | 10/2003 | Gentilcore |
| 2003/0216845 A1 | 11/2003 | Williston |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0172178 A1* | 9/2004 | Takeda ................ A63B 24/00 701/1 |
| 2004/0208687 A1 | 10/2004 | Sicz et al. |
| 2004/0220708 A1 | 11/2004 | Owen et al. |
| 2004/0220712 A1* | 11/2004 | Takeda ................... B62J 99/00 701/32.5 |
| 2004/0222056 A1 | 11/2004 | Fox |
| 2004/0256778 A1 | 12/2004 | Verriet |
| 2005/0055156 A1 | 3/2005 | Maltagliati et al. |
| 2005/0056507 A1 | 3/2005 | De Molina et al. |
| 2005/0077131 A1 | 4/2005 | Russell |
| 2005/0098401 A1 | 5/2005 | Hamilton et al. |
| 2005/0104320 A1 | 5/2005 | Wesling et al. |
| 2005/0107216 A1 | 5/2005 | Lee et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0195094 A1 | 9/2005 | White |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Moss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0124414 A1 | 6/2006 | Hanawa |
| 2006/0136173 A1 | 6/2006 | Case et al. |
| 2006/0137934 A1 | 6/2006 | Kurth |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0231359 A1 | 10/2006 | Matsunaga et al. |
| 2006/0237272 A1 | 10/2006 | Huang |
| 2006/0253210 A1 | 11/2006 | Rosenberg |
| 2006/0254365 A1 | 11/2006 | Hamel |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021885 A1 | 1/2007 | Soehren |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | McAndrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0213150 A1 | 9/2007 | Chattin et al. |
| 2007/0221054 A1 | 9/2007 | Webster et al. |
| 2007/0239479 A1 | 10/2007 | Arrasvuori et al. |
| 2007/0260372 A1 | 11/2007 | Langer |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0096726 A1 | 4/2008 | Riley et al. |
| 2008/0099968 A1 | 5/2008 | Schroeder |
| 2008/0108465 A1 | 5/2008 | Ichida |
| 2008/0109158 A1 | 5/2008 | Huhtala et al. |
| 2008/0116622 A1 | 5/2008 | Fox |
| 2008/0119330 A1* | 5/2008 | Chiang ................ A63B 24/00 482/8 |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0001684 A1 | 1/2009 | McAndrews et al. |
| 2009/0020382 A1 | 1/2009 | Van Weelden et al. |
| 2009/0038897 A1 | 2/2009 | Murakami |
| 2009/0048070 A1 | 2/2009 | Vincent et al. |
| 2009/0069972 A1 | 3/2009 | Templeton et al. |
| 2009/0070037 A1 | 3/2009 | Templeton et al. |
| 2009/0071772 A1 | 3/2009 | Cho et al. |
| 2009/0071773 A1 | 3/2009 | Lun |
| 2009/0098981 A1 | 4/2009 | Del et al. |
| 2009/0102628 A1 | 4/2009 | Takebayashi |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0140501 A1 | 6/2009 | Taylor et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0200760 A1 | 8/2009 | Gartner et al. |
| 2009/0236807 A1 | 9/2009 | Wootten et al. |
| 2009/0258710 A1 | 10/2009 | Quatrochi et al. |
| 2009/0261542 A1 | 10/2009 | McIntyre |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0314592 A1 | 12/2009 | Nygren |
| 2009/0324327 A1 | 12/2009 | McAndrews et al. |

(56) References Cited

U.S. PATENT DOCUMENTS

| | | |
|---|---|---|
| 2010/0004097 A1 | 1/2010 | D'Eredita |
| 2010/0010709 A1 | 1/2010 | Song |
| 2010/0025946 A1 | 2/2010 | Inoue et al. |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0164705 A1 | 7/2010 | Blanchard |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0271191 A1 | 10/2010 | De Graff et al. |
| 2010/0276238 A1 | 11/2010 | Crasset |
| 2010/0276906 A1 | 11/2010 | Galasso et al. |
| 2010/0308516 A1 | 12/2010 | Galasso et al. |
| 2010/0308628 A1 | 12/2010 | Hsu et al. |
| 2010/0314917 A1 | 12/2010 | Hsieh et al. |
| 2010/0324781 A1 | 12/2010 | Gagliano |
| 2010/0327542 A1 | 12/2010 | Hara et al. |
| 2011/0022266 A1 | 1/2011 | Ippolito et al. |
| 2011/0067965 A1 | 3/2011 | McAndrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0224901 A1 | 9/2011 | Aben et al. |
| 2011/0232147 A1 | 9/2011 | Zoellner et al. |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0074660 A1 | 3/2012 | Thomas |
| 2012/0080279 A1 | 4/2012 | Galasso et al. |
| 2012/0136537 A1 | 5/2012 | Galasso et al. |
| 2012/0166044 A1 | 6/2012 | Battlogg et al. |
| 2012/0181126 A1 | 7/2012 | De Kock |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0265414 A1 | 10/2012 | Cheng |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0020748 A1 | 1/2013 | Kohlhauser et al. |
| 2013/0037361 A1 | 2/2013 | Park et al. |
| 2013/0090195 A1 | 4/2013 | Hamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1 | 8/2013 | Zhan et al. |
| 2013/0221713 A1 | 8/2013 | Pelot et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0073656 A1* | 3/2015 | Takamoto .......... B62J 1/06 701/37 |
| 2015/0081171 A1 | 3/2015 | Ericksen et al. |
| 2015/0090547 A1 | 4/2015 | Haugen |
| 2015/0141056 A1 | 5/2015 | Fefilatyev et al. |
| 2015/0175236 A1 | 6/2015 | Walthert et al. |
| 2015/0179062 A1 | 6/2015 | Ralston et al. |
| 2015/0191069 A1 | 7/2015 | Zuleger et al. |
| 2015/0197308 A1 | 7/2015 | Butora et al. |
| 2015/0233442 A1 | 8/2015 | Noguchi |
| 2015/0291248 A1 | 10/2015 | Fukao et al. |
| 2016/0025178 A1 | 1/2016 | Kamakura et al. |
| 2016/0031506 A1* | 2/2016 | Lloyd .......... B60L 15/20 701/49 |
| 2016/0076617 A1 | 3/2016 | Marking |
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0200163 A1 | 7/2016 | Tsukahara |
| 2016/0200164 A1 | 7/2016 | Tabata et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2016/0364989 A1 | 12/2016 | Speasl et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0247072 A1 | 8/2017 | Laird et al. |
| 2017/0259876 A1 | 9/2017 | Ericksen et al. |
| 2017/0268595 A1 | 9/2017 | Inagaki et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0150764 A1 | 5/2018 | Stenneth |
| 2018/0174446 A1 | 6/2018 | Wang |
| 2018/0222541 A1 | 8/2018 | Madau et al. |
| 2018/0326808 A1 | 11/2018 | Ericksen et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355946 A1 | 12/2018 | Ericksen et al. |
| 2019/0030975 A1 | 1/2019 | Galasso et al. |
| 2019/0032745 A1 | 1/2019 | Marking |
| 2019/0092116 A1 | 3/2019 | Magnus et al. |
| 2019/0154100 A1 | 5/2019 | Coaplen et al. |
| 2019/0176557 A1 | 6/2019 | Marking et al. |
| 2019/0184782 A1 | 6/2019 | Shaw et al. |
| 2019/0203798 A1 | 7/2019 | Cox et al. |
| 2019/0249769 A1 | 8/2019 | Hamed |
| 2019/0263474 A1 | 8/2019 | Hamed |
| 2019/0301598 A1 | 10/2019 | Sonenthal |
| 2020/0191227 A1 | 6/2020 | Laird |
| 2022/0252129 A1 | 8/2022 | Haugen |

FOREIGN PATENT DOCUMENTS

| | | |
|---|---|---|
| DE | 3532292 A1 | 3/1987 |
| DE | 3536655 A1 | 4/1987 |
| DE | 3709447 A1 | 10/1988 |
| DE | 3711442 A1 | 10/1988 |
| DE | 3738048 A1 | 5/1989 |
| DE | 3924166 C1 | 2/1991 |
| DE | 4022099 C1 | 12/1991 |
| DE | 4029090 A1 | 3/1992 |
| DE | 4406918 A1 | 9/1994 |
| DE | 202004005229 U1 | 8/2004 |
| DE | 10326675 A1 | 12/2004 |
| DE | 102005025811 A1 | 12/2006 |
| DE | 102007056313 A1 | 5/2009 |
| DE | 102007063365 A1 | 7/2009 |
| DE | 202008015968 U1 | 4/2010 |

(56) References Cited

FOREIGN PATENT DOCUMENTS

| | | |
|---|---|---|
| DE | 202010012738 U1 | 12/2010 |
| EP | 207409 A2 | 1/1987 |
| EP | 304801 A2 | 3/1989 |
| EP | 0306819 A2 | 3/1989 |
| EP | 0403803 A1 | 12/1990 |
| EP | 552568 A1 | 7/1993 |
| EP | 0735280 A2 | 10/1996 |
| EP | 0806587 A1 | 11/1997 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1662167 A1 | 5/2006 |
| EP | 1757473 A2 | 2/2007 |
| EP | 1825220 A2 | 8/2007 |
| EP | 2103512 A2 | 9/2009 |
| EP | 2116739 A2 | 11/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| EP | 2567839 B1 | 3/2019 |
| EP | 3786049 A1 | 3/2021 |
| FR | 1343760 A | 11/1963 |
| FR | 2432424 A1 | 2/1980 |
| FR | 2449236 A1 | 9/1980 |
| FR | 2529002 A2 | 12/1983 |
| FR | 2617928 A1 | 1/1989 |
| FR | 2952031 A1 | 5/2011 |
| GB | 806307 A | 12/1958 |
| GB | 1185074 A | 3/1970 |
| GB | 2104183 A | 3/1983 |
| GB | 2159234 A | 11/1985 |
| GB | 2159604 A | 12/1985 |
| GB | 2180320 A | 3/1987 |
| GB | 2282864 A | 4/1995 |
| GB | 2289111 A | 11/1995 |
| JP | 57173632 A | 10/1982 |
| JP | 57173632 U | 11/1982 |
| JP | 57182506 A | 11/1982 |
| JP | 01106721 A | 4/1989 |
| JP | H0193637 A | 4/1989 |
| JP | H02168038 A | 6/1990 |
| JP | H03113139 A | 5/1991 |
| JP | 04203540 A | 7/1992 |
| JP | 05149364 A | 6/1993 |
| JP | H05319054 A | 12/1993 |
| JP | 06101735 A | 4/1994 |
| JP | 06185562 A | 7/1994 |
| JP | H084818 A | 1/1996 |
| JP | 2005119548 A | 5/2005 |
| JP | 2005119549 A | 5/2005 |
| JP | 2007302211 A | 11/2007 |
| JP | 2008238921 A | 10/2008 |
| KR | 20070076226 A | 7/2007 |
| KR | 20100041679 A | 4/2010 |
| RU | 2469224 C1 | 12/2012 |
| WO | 9840231 A2 | 9/1998 |
| WO | 99/06231 | 2/1999 |
| WO | 0027658 A1 | 5/2000 |
| WO | 03070546 A1 | 8/2003 |
| WO | 2006065235 A2 | 6/2006 |
| WO | 2007017739 A2 | 2/2007 |
| WO | 2007117884 A2 | 10/2007 |
| WO | 2008086605 A1 | 7/2008 |
| WO | 2008114445 A1 | 9/2008 |
| WO | 2021066819 A1 | 4/2021 |

OTHER PUBLICATIONS

U.S. Appl. No. 61/302,070, filed Feb. 5, 2010, Mario Galasso et al., 39 Pages.
"Basis For Claims Filed Jan. 23, 2015", European Patent Application No. 14189773.6, 2 Pages.
"17 Years of Innovation and Still Evolving", https://www.powertap.com/post/blog-15-17-years-of-innovation-and-still-evolving, Nov. 28, 2018, 8 Pages.
"ANT Message Protocol and Usage", Dynastream Innovations, Inc., Jul. 2, 2007, 68 Pages.
Thum, Notice of Opposition to a European Patent, EP App. No. 14189773.6, Dec. 13, 2018, 49 Pages.
"European Search Report for EP Application No. 18154672, 3 pages, dated Aug. 28, 2018 (Aug. 28, 2018))".
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Thum, "Opposition Letter Against EP2357098", Oct. 16, 2018, 39.
Waechter, et al., "A Multibody Model for the Simulation of Bicycle Suspension Systems", Vehicle System Dynamics, vol. 37, No. 1, 2002, 3-28.
European Search Report for European Application No. 19155995, 11 pages, dated Aug. 28, 2019.
European Search Report for European Application No. 19157767, dated Oct. 16, 2019, 9 Pages.
Thum, "Opposition Letter Against EP2357098", Dec. 17, 2019, 25 Pages.
European Search Report for European Application No. 19206334.5, 6 pages, dated May 12, 2020 (dated May 12, 2020).
European Search Report for European Application No. 19212356.0, 8 pages, dated May 7, 2020 (dated May 7, 2020).
Machine translation DE3613386; Oct. 1986.
Machine translation EP 0403803; Dec. 1990.
Machine translation KR20100041679; Apr. 2010.
European Search Report for European Application No. 20187747, dated Nov. 18, 2020, 11 Pages.
Electronic Translation of DE3709447A1.
English language abstract for EP 0207409 (no date).
Fachkunde Fahrradtechnik 4 Auflage, Gressmann_Inhaltv und S, 2011, 206-207.
Statement of Grounds of Appeal, EP App. No. 11153607.4, May 28, 2018, 88 Pages.
European Search Report, European Patent Application No. 14189773.6, dated May 4, 2015, 4 Pages.
Grounds of Appeal, EP App. No. 11153607.4, Jun. 1, 2018, 28 Pages.
EP Search Report for European Application No. 15163428.4, dated Jul. 3, 2017, 7 Pages.
"Communication Re Oral Proceedings for European Application No. 10161906, dated Feb. 15, 2013 (Feb. 15, 2013)".
"European Patent Office Final Decision dated Mar. 21, 2013", European Patent Application No. 10161906.2.
"European Search Report for European Application No. 09177128, 4 pages, dated Aug. 25, 2010 (dated Aug. 25, 2010)".
"European Search Report for European Application No. 10161906, 3 pages, dated Sep. 15, 2010 (dated Sep. 15, 2010)".
"European Search Report for European Application No. 10187320, 12 pages, dated Sep. 25, 2017 (dated Sep. 25, 2017)".
"European Search Report for European Application No. 11153607, 3 pages,dated Aug. 10, 2012 (dated Aug. 10, 2012))".
"European Search Report for European Application No. 11172553, 2 pages, dated Sep. 25, 2017 (dated Sep. 25, 2017)".
"European Search Report for European Application No. 11172612, 2 pages, dated Oct. 6, 2011 (dated Oct. 6, 2011))".
"European Search Report for European Application No. 11175126, 2 pages,dated Sep. 25, 2017 (dated Sep. 25, 2017)".
"European Search Report for European Application No. 11275170, 2 pages, dated Jan. 10, 2018 (dated Jan. 10, 2018)".

(56) References Cited

OTHER PUBLICATIONS

"European Search Report for European Application No. 12170370, 2 pages, dated Nov. 15, 2017 (dated Nov. 15, 2017)".
"European Search Report for European Application No. 12184150, 10 pages, dated Dec. 12, 2017 (dated Dec. 12, 2017)".
"European Search Report for European Application No. 13158034, 4 pages, dated Jun. 28, 2013 (dated Jun. 28, 2013))".
"European Search Report for European Application No. 13174817. 0, 13 pages, dated Jan. 8, 2018 (dated Jan. 8, 2018))".
"European Search Report for European Application No. 13189574, 2 pages, dated Feb. 19, 2014 (dated Feb. 19, 2014)".
"European Search Report for European Application No. 15167426, 4 pages, dated Sep. 18, 2015 (dated Sep. 18, 2015))".
"European Search Report for European Application No. 16167306, 2 pages, dated Mar. 23, 2017 (dated Mar. 23, 2017)".
"European Search Report for European Application No. 17154191, 2 pages, dated Jun. 28, 2017 (dated Jun. 28, 2017)".
"European Search Report for European Application No. 17188022, 9 pages, dated Feb. 1, 2018 (dated Feb. 1, 2018))".
"European Search Report and Written Opinion, European Patent Application No. 13165362.8", dated Sep. 24, 2014, 6 Pages.
"Office Action for European Application No. 13158034.2, 5 pages, dated May 22, 2014".
Nilsson, "Opposition Letter Against EP-2357098", Oct. 13, 2017, 7.
Puhn, "How To Make Your Car Handle", HPBooks, 1981, 7 Pages.
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.
Smith, ""The Bump Stop" in Engineer to win—Chapter 13: Springs and Shock Absorbers", MBI Publishing Company and Motorbooks, USAXP055430818, ISBN: 978-0-87938-186-8, Dec. 31, 1984, 207.
European Search Report for European Application No. 21170685.8, dated Nov. 10, 2021, 8 Pages.
EP Search Report for European Application No. 21173940.4, dated Nov. 12, 2021, 9 Pages.
European Examination Report for EP Application No. 11188520.8, 9 pages, dated Jul. 19, 2022.
European Examination Report for European Application No. 11275170. 6, 6 pages, dated Oct. 20, 2022.
Kensuke, Suspension Control Device, machine translation of JPH05319054 (A), Dec. 3, 1993 (Year: 1993).

* cited by examiner

METHODS AND APPARATUS FOR SUSPENSION ADJUSTMENT

CROSS-REFERENCE TO RELATED APPLICATIONS

This application is a continuation application of and claims the benefit of U.S. patent application Ser. No. 13/022,346, filed on Feb. 7, 2011, entitled "METHODS AND APPARATUS FOR SUSPENSION ADJUSTMENT" by Galasso et al., assigned to the assignee of the present application, and is hereby incorporated by reference in its entirety herein.

The application with Ser. No. 13/022,346, claims the benefit of and claims priority of U.S. provisional patent application Ser. No. 61/302,070, filed on Feb. 5, 2010, entitled "METHOD AND APPARATUS FOR SUSPENSION ADJUSTMENT" by Galasso et al., assigned to the assignee of the present application, and is hereby incorporated by reference in its entirety herein.

The application with Ser. No. 13/022,346 is a continuation-in-part application of and claims the benefit of U.S. patent application Ser. No. 12/773,671, filed on May 4, 2010, entitled "SUSPENSION SYSTEM FOR A VEHICLE" by Galasso et al., assigned to the assignee of the present application, and is hereby incorporated by reference in its entirety herein.

The application with Ser. No. 12/773,671, claims the benefit of and claims priority of U.S. provisional patent application Ser. No. 61/175,422, filed on May 4, 2009, entitled "METHODS AND APPARATUS FOR VARIABLE DAMPING RATE" by Galasso et al., assigned to the assignee of the present application, and is hereby incorporated by reference in its entirety herein.

The application with Ser. No. 13/022,346 is a continuation-in-part application of and claims the benefit of U.S. patent application Ser. No. 12/727,915, now U.S. Issued U.S. Pat. No. 9,140,325, filed on Mar. 19, 2010, entitled "METHODS AND APPARATUS FOR SELECTIVE SPRING PRE-LOAD ADJUSTMENT" by Cox et al., assigned to the assignee of the present application, and is hereby incorporated by reference in its entirety herein.

The application with Ser. No. 12/727,915 claims the benefit of and claims priority of U.S. provisional patent application Ser. No. 61/161,552, filed on Mar. 19, 2009, entitled "METHODS AND APPARATUS FOR SELECTIVE SPRING PRE-LOAD ADJUSTMENT" by Cox et al., assigned to the assignee of the present application, and is hereby incorporated by reference in its entirety herein.

The application with Ser. No. 12/727,915 claims the benefit of and claims priority of U.S. provisional patent application Ser. No. 61/161,620, filed on Mar. 19, 2009, entitled "METHODS AND APPARATUS FOR SELECTIVE SPRING PRE-LOAD ADJUSTMENT" by Cox et al., assigned to the assignee of the present application, and is hereby incorporated by reference in its entirety herein.

BACKGROUND

Field of the Invention

The invention generally relates to methods and apparatus of an integrated adjustment system for vehicles. Embodiments generally relate to methods and apparatus for use with vehicle suspension system. In particular, embodiments relate to a system for adjusting operational characteristics of a vehicle suspension system.

Description of the Related Art

Despite efforts to educate product managers, retailers, and end consumers on the importance of proper initial vehicle suspension set up, it is evident at event support and trail side encounters that many mountain bikes and motorcycles are ridden with improper suspension initial settings. An important initial setting is suspension "sag." Suspension sag is the measured distance a shock absorber compresses while the rider, wearing intended riding gear, is seated on (for example) a bicycle or motorcycle (or four wheeled vehicle) in a riding position, versus a fully extended suspension position (sag also applies to ATVs, trucks, and other suspension equipped vehicles). Getting the sag correct sets the front end steering/handling geometry, puts the rear suspension at its intended linkage articulation for pedaling efficiency (if applicable) and bump absorption and provides some initial suspension compression to allow the wheels/ suspension to react to negative terrain features (e.g. dips requiring suspension extension) without the entire vehicle "falling" into those features. Often, any attention that is paid to this initial sag setting is focused on the rear suspension, especially in motorcycle applications, but making sure that both the front and rear sag settings are correct is equally important.

Another important initial setting is the rebound damping setting for the rear and the front vehicle suspensions. Rebound damping dissipates stored system spring energy after a suspension compression event and results in a controlled rate of return of the suspension to a more extended condition. It is important for the suspension not to rebound too quickly. In the case of rear suspension, this can result in the rear of the vehicle kicking off the ground and pitching the rider forward after encountering a bump or sharp compression obstacle ("bucking"). In the case of front suspension, it can cause impact to the rider's hands as the front suspension kicks back directly towards the rider in the case of quick rebound. It is also important for the suspension not to rebound too slowly. This can result in the suspension not returning quickly enough to respond to the next bump in a series of bumps, ultimately causing the suspension to "ratchet" itself down into a compressed state. Such a "ratchet" sequence is commonly referred to as suspension "packing." Packing can result in the suspension being overly stiff (due to retained compression) through the middle to the end of a series of bumps, causing the back of the vehicle kicking off the ground and pitching the rider forward in the case of the rear suspension and causing the suspension to get overly stiff and steering geometry to get steep and unstable in the case of the front suspension. Compression damping setting is similarly important.

Therefore, there is a need for methods and apparatus for assisting the operator of a vehicle to prepare and adjust one or more operating parameters of the vehicle for an optimum riding experience.

SUMMARY OF THE INVENTION

In one embodiment, a system for a vehicle may comprise a vehicle suspension; a sensor operable to measure an operational characteristic of the vehicle suspension; and a processor in communication with the sensor and operable to suggest an operational setting of the vehicle suspension in response to an input from the sensor corresponding to the operational characteristic.

In one embodiment, a system for a vehicle may comprise a sensor operable to measure an operational characteristic of the vehicle; a processor operable to receive data from the sensor corresponding to the operational characteristic; and a communication device operable to receive data from the processor and display information regarding the operational characteristic of the vehicle.

In one embodiment, a method for adjusting a suspension of a vehicle may comprise receiving suspension data with a processor; calculating a suspension setting suggestion with the processor; communicating the suspension setting suggestion to a user interface device; and adjusting the suspension based on the suspension setting suggestion.

In one embodiment, a suspension system may comprise a vehicle suspension; a sensor positioned to sense a feature of the suspension; a computer readable medium having an operative communication link with the sensor; a processor having an operative communication link with the computer readable medium; a transmitter having an operative communication link with the processor; and a graphical user interface having an operative communication link with the transmitter.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Integrated damper/spring vehicle shock absorbers often include a damper body surrounded by a mechanical spring or constructed in conjunction with an air spring. The damper often consists of a piston and shaft telescopically mounted in a fluid filled cylinder. A mechanical spring may be a helically wound spring that surrounds the damper body. Various integrated shock absorber configurations are described in U.S. Pat. Nos. 5,044,614; 5,803,443; 5,553,836; and 7,293,764; each of which is herein incorporated, in its entirety, by reference.

Figure 1:
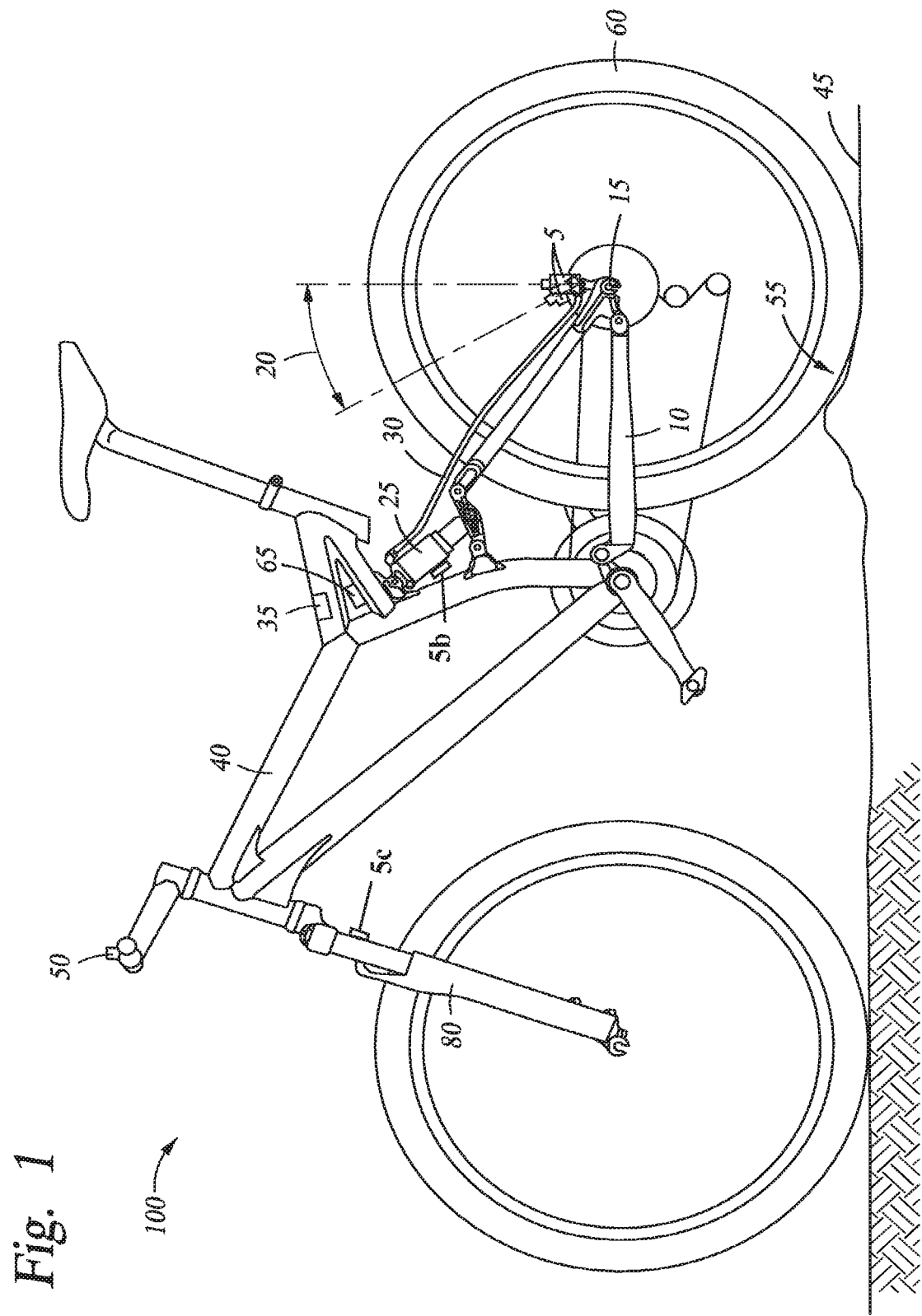
FIG. 1 illustrates a schematic side view of a vehicle according to one embodiment.

FIGS. 1 and 2 of U.S. Pat. No. 5,044,614 show a damper body carrying a thread 42. A helical spring 18 surrounds the damper body. The compression in the helical spring 18 may be pre-set by means of a nut 48 and a lock nut 50. The nut 48 may be translated axially relative to the body ("tube") 16 and thread 42 by rotating the nut 48 around the threaded sleeve 42. Rotation of the nut 48 in a given direction (e.g. clockwise as viewed from end 44 for a right hand thread 42) will cause the nut to move toward the retainer clip 26 thereby compressing spring 18 between the nut 48 and the retainer clip 26. Once the spring 18 is in a desired state of compression, lock nut 50 is rotated, using a wrench, up against nut 48 and tightened in a binding relation therewith.

Some shock absorbers utilize gas as a spring medium in place of, or in addition to, mechanical springs. Gas spring type shock absorbers, such as for example those having integral dampers, are described in U.S. Pat. Nos. 6,135,434; 6,360,857 and 6,311,962; each of which is herein incorporated, in its entirety, by reference. U.S. Pat. No. 6,360,857 shows a shock absorber having selectively adjustable damping characteristics. U.S. Pat. No. 7,163,222 which is incorporated herein, in its entirety, by reference, describes a gas sprung front shock absorber for a bicycle (a "fork") having a selective "lock out" and adjustable "blow off" function.

The spring mechanism (gas or mechanical) of some shock absorbers is adjustable so that it can be preset to varying initial states of compression. In some instances the shock spring (gas or mechanical) may comprise different stages having varying spring rates thereby giving the overall shock absorber a compound spring rate varying through the stroke length. In that way the shock absorber can be adjusted to accommodate heavier or lighter carried weight, or greater or lesser anticipated impact loads. In vehicle applications including motorcycle and bicycle applications and particularly off-road applications, shock absorbers are pre-adjusted to account for varying terrain and anticipated speeds and jumps. Shocks are also adjusted according to certain rider preferences (e.g. soft—firm).

A type of integrated damper/spring shock absorber, having a gas spring, is shown in FIG. 28, for example, of U.S. Pat. No. 7,374,028 ("028 patent"), which is incorporated herein, in its entirety, by reference. The shock absorber of FIG. 28 also includes an "adjustable intensifier assembly 510." That intensifier or "reservoir" accepts damping fluid from chamber 170 as the fluid is displaced from that chamber by the incursion of rod 620 into chamber 170 during a compression stroke of the shock. The intensifier valve assembly regulates flow of damping fluid into and out of the reservoir, and an embodiment of the valve assembly is shown in FIG. 17 of the '028 patent.

It is desirable to "lock out" the suspension, thereby rendering it substantially rigid, on certain vehicles at certain times. Such lock out may be particularly desirable on bicycles to reduce or eliminate so called "pedal bob" or "chain squat" (the cyclic compression and extension of suspension caused by the cyclic tension of the drive chain and the cyclic motion of the pedals, cranks and power input generally). It is noteworthy that the valve assembly of FIG. 17 of the '028 patent may be replaced with any suitable valve assembly depending on the desired result. For example, when the valve is configured (as will be further described herein) with a selectable and correspondingly selected "lock out" (i.e. substantially complete valve closure) damping fluid is excluded from entering the reservoir and, the damping fluid being a relatively incompressible liquid, such exclusion prevents the volume of chamber 170 from being reduced and thereby prevents the shock absorber from compressing telescopically. Such "lock out" may be selectively provided via an external manual adjuster, such as for example knob 512 of FIG. 17, or it may be provided automatically in response to some predetermined and sensed vehicle operation condition (e.g. smooth terrain). Alternatively, a "lock out" condition may be the default mode for the suspension whereby the suspension becomes active only upon some predetermined and sensed vehicle operation condition (e.g. rough terrain) wherein a sensor senses the condition and opens the "lock out" so that the suspension may operate for a prescribed period of time or terrain input.

Although described herein with respect to a bicycle suspension system, the embodiments illustrated in FIGS. 1-11 herein may be used with any type of suspended vehicle, as well as other types of suspension or damping systems.

Referring to FIG. 1 herein, a vehicle, such as a bicycle, generally identified by reference numeral 100 comprises a frame 40 and front forks 80. In this embodiment the frame 40 has a suspension system comprising a swing arm assembly 10 that, in use, is able to move relative to the rest of the frame; this movement is permitted by, inter alia, a rear shock absorber and/or damping assembly 25. The front forks 80 also provide a suspension function via a damping assembly in at least one fork leg; as such the bicycle 100 is a full suspension bicycle (such as an ATB or mountain bike), although the embodiments described herein are not limited to use on full suspension bicycles. In particular, the term "suspension system" is intended to include vehicles having front suspension or rear suspension only, or both and other systems wherein motion damping is included (such as for example vehicle steering dampeners or machine part motion dampeners).

In one embodiment, a sensor 5 may be positioned proximate a rear axle 15 of the bicycle 100 for sensing changes in terrain. As shown in FIG. 1, the sensor 5 is mounted on swing arm assembly 10 proximate the rear axle 15 of the bicycle 100. In one embodiment the angular orientation of a sensor 5 sensing axis is movable through a range or angle 20 (and is shown in each of two positions of many possible positions), thereby allowing alteration of a force component sensed by the sensor in relation to a force (vector) input into the rear swing arm 10. It is understood that the sensor 5 may be moved or mounted in any suitable configuration and allowing for any suitable range of adjustment as may be desirable. It is understood that the sensor may include one, two, three or more sensing axis'. That is useful for adjusting the sensitivity of the sensor 5 to various anticipated terrain and bicycle speed conditions. The bicycle speed affects the vector direction of a force input to the bicycle wheel for constant amplitude terrain 45 disparity 55 or "bump/dip." Varying size bumps and dips also affect the vector input angle to the wheel for constant bicycle speed. The movement of the swing arm is however limited to a mechanically determined trajectory. In one embodiment, a sensor 5b (also illustrated in FIG. 2A) may be coupled to the rear suspension, such as shock absorber and/or damper assembly 25, for measuring the operational characteristics of the rear suspension. In one embodiment, a sensor 5c may be coupled to the front suspension, such as front forks 80, for measuring the operational characteristics of the front suspension. The operational characteristics may include at least one of position, velocity, acceleration, stroke, sag, compression, rebound, pressure, and temperature of the vehicle suspension.

The sensor 5 (and sensors 5b, 5c, 35, 65 and a pedal force sensor (not shown)) may be any suitable force or acceleration transducer (e.g. strain gage, wheatstone bridge, accelerometer, hydraulic cylinder, interferometer based, optical, thermal, acoustic or any suitable combination thereof). The sensor 5 may utilize solid state electronics, electro-mechanical principles, or any other suitable mechanisms. In one embodiment the sensor 5 comprises a single axis self powered accelerometer, such as for example ENDEVCO Model 2229C. The 2229C is a comparatively small device with overall dimensions of about 15 mm height by 10 mm diameter, and weighs about 4.9 g. Its power is self-generated and therefore the total power requirements for the bicycle 100 are reduced; this is an important advantage, at least for some types of bicycle, where overall weight is a concern. In one embodiment, the single axis accelerometer comprises the ENDEVCO 12M1A, which is of the surface-mount type. The 12M1A is a single axis accelerometer comprising a bimorph sending element which operates in the bender mode. This accelerometer is particularly small and light, measuring about 4.5 mm by 3.8 mm by 0.85 mm, and weighs about 0.12 g. In other embodiments, the sensor 5 may be a tri-axial accelerometer such as the ENDEVCO 67-100. This device has overall dimensions of about 23 mm length and 15 mm width, and weighs about 14 g. Other sensors known in the art may be used with the embodiments described herein.

In one embodiment, the sensor 5 may be attached to the swing arm 10 directly, to any link thereof, to an intermediate mounting member or to any other portion or portions of the bicycle 100 as may be useful for purposes disclosed herein. In one embodiment the sensor 5 is fixed to an unsprung portion of the bicycle 100, such as for example the swing arm 10, and another sensor 35 (such as an accelerometer as described above) is fixed to a sprung portion of the bicycle 100, such as for example the frame 40. Data from each sensor can, by a processor, be overlayed on a common time datum and suspension damping and/or spring effectiveness can be evaluated by comparing the data from the sensors on either "side" of the suspension unit. Sensors may be integrated with the vehicle structure and data processing system as described in U.S. Pat. Nos. 6,863,291; 4,773,671; 4,984,819; 5,390,949; 5,105,918; 6,427,812; 6,244,398; 5,027,303 and 6,935,157; each of which is herein incorporated, in its entirety, by reference. Sensors and valve actuators (e.g. electric solenoid or linear motor type—note that a rotary motor may also be used with a rotary actuated valve) may be integrated herein utilizing principles outlined in SP-861-Vehicle Dynamics and Electronic Controlled Suspensions SAE Technical Paper Series no. 910661 by Shiozaki et al. for the International Congress and Exposition, Detroit, Mich., Feb. 25-Mar. 1, 1991 which paper is incorporated herein, in its entirety, by reference. Further, sensors and valves, or principles, of patents and other documents incorporated herein by reference, may be integrated into embodiments hereof, individually or in combination, as disclosed herein.

In one embodiment the shock absorber 25 is operatively mounted between an unsprung portion of the bicycle 100, such as the swing arm 10 and rear axle 15, and a sprung portion of the bicycle 100 such as the frame 40. A representative example embodiment of the shock absorber 25 derives from a modification, as disclosed herein, of the shock absorber shown in FIG. 28 of, and elsewhere in, U.S. Pat. No. 7,374,028 (the "028" patent) which is incorporated herein by reference.

Figure 2A:
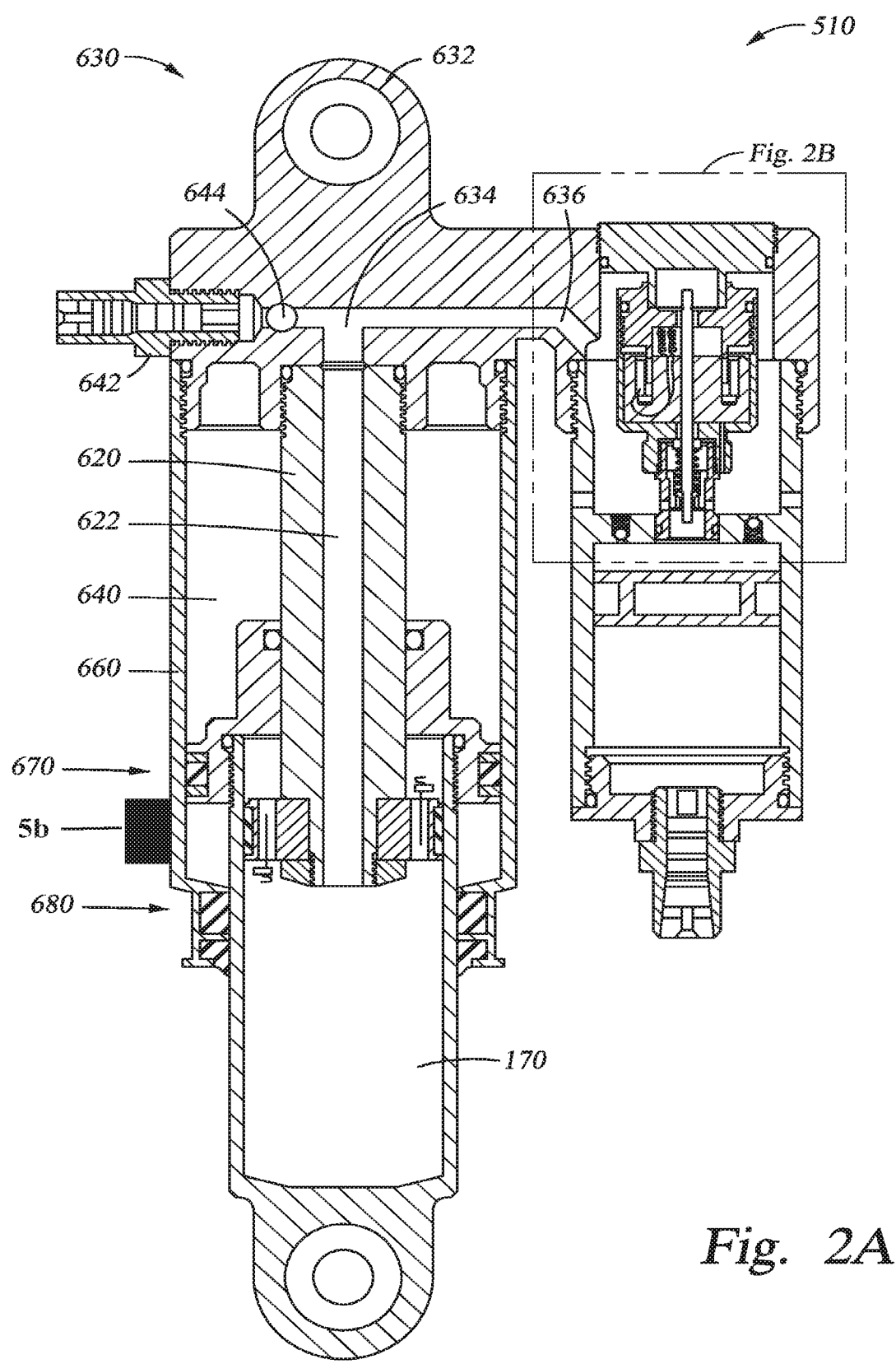
FIG. 2A illustrates a side view in cross section of a damper assembly according to one embodiment.
Figure 2B:
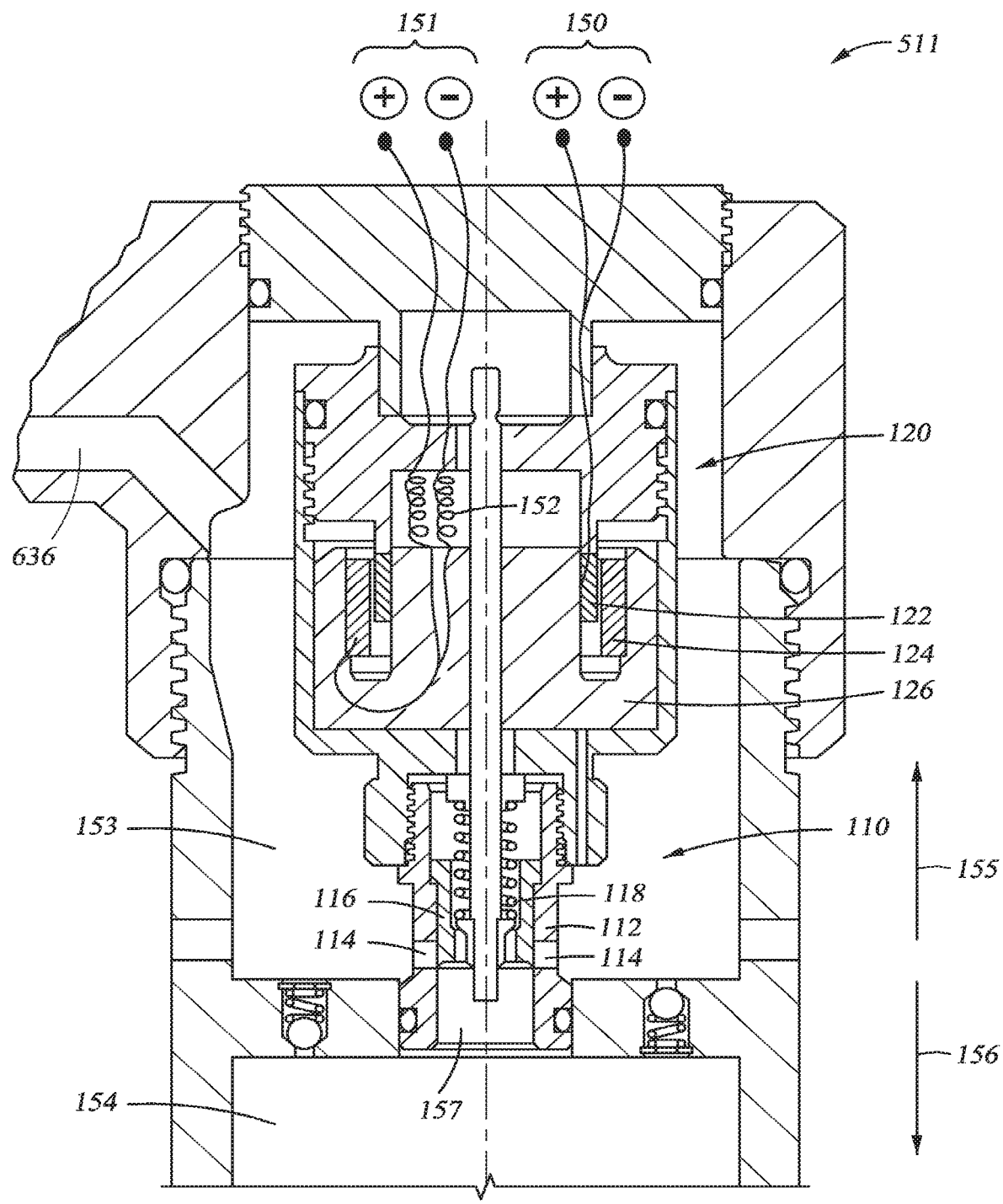
FIG. 2B illustrates an enlarged view of part of the damper assembly of FIG. 2A according to one embodiment.

Referring to FIG. 2A herein, an intensifier assembly 510 is shown in conjunction with a damper assembly 630. In one embodiment, the damper assembly 630 is disclosed in FIG. 28 of the '028 patent and includes similar reference numerals. FIG. 2B shows an embodiment of a valve assembly 511, such as an intensifier valve, for use with the embodiments disclosed herein. In one embodiment, the valve assembly 511 of FIG. 2B replaces or may be used with the "adjustable intensifier assembly" 510, as shown in FIGS. 16, 17, 28 and elsewhere in the '028 patent. The valve assembly 511 is operable in response to electric current and is capable of being modulated or throttled for selective full opening, closing and intermediate opening or "throttle" positions. The valve assembly 511 comprises a valve portion 110 and an actuator portion 120. The valve portion 110 may include a cylinder 112 with one or more variable orifices 114 and a member (e.g. piston) 116 that moves within the cylinder 112 to control the opening of the orifice(s) 114. The valve assembly 511 is in a closed position when the piston 116 is covering the orifice(s) 114. The valve assembly 511 is in an open position when the piston 116 moves away from the orifice(s) 114 such that at least a portion of the orifice(s) 114 is opened. In the open position, fluid may flow into the valve portion 110 and may flow out of the valve portion 110. The position of the piston 116 relative to the orifice(s) 114 varies the orifice opening and the flow through the valve portion 110. The valve assembly 511 may thus provide an output pressure in response to an input flow.

The valve portion 110 may also include a spring 118 that applies a force against the piston 116 to bias the piston 116 toward the closed position. Fluid pressure against the piston 116 may result in a force that exceeds the spring force causing the piston 116 to move and open the orifice(s) 114.

The actuator portion 120 may also apply a force to the piston 116. The actuator portion 120 may advantageously be back drivable to permit the pressure term to push open the valve, for example, during the onset of a high shock event. One embodiment of the actuator portion 120 is a voice coil type linear actuator including a voice coil 122, a magnet 124, and a back iron 126. The back iron 126 is coupled to the piston 116 such that linear movement of the back iron 126 causes linear movement of the piston 116.

The actuator portion 120 may be controlled using a command such as a voltage command, for example, provided by drive electronics. A voltage command or signal to the actuator portion 120 causes current to flow through the coil 122, creating a magnetic field that applies a force to the magnet 124 and back iron 126. Different voltage commands may thus correspond to different amounts of force applied to the piston 116 in the valve assembly 511. In one embodiment the signals and actuator are configured to move the valve completely between a full open ("unlocked") and a full closed position ("locked") thereby allowing the damper to move or substantially locking it, i.e. adjusting the damping rate of the damping assembly 630 between minimum and maximum respectively.

Although one exemplary valve is shown, those skilled in the art will recognize that other types of valves may be used. Although the exemplary actuator 120 is a voice coil type linear actuator, those skilled in the art will recognize that other types of actuator technologies may be used. For example, the sensors, switches, controllers, actuators and other operative elements hereof may comprise optical circuitry and as such the power source may comprises an optical (or other electromagnetic) generator such as a "LASER" and wiring and circuits used herein may comprises fiber optic and optic circuitry including Bragg grating technology and other suitable "electrical equivalents." The elements hereof may be operable in whole or in part based on sonic wave or microwave transmission and suitable waveguide technology may be employed. An operation of an intensifier valve that may be used with the embodiments described herein is disclosed in U.S. Pat. No. 7,299,112 which is incorporated herein by reference in its entirety.

It should be noted that 122 and 124 are interchangeable such that the voice coil may be either 122 or 124 and the magnet may be the other of 122 and 124 respectively. The voice coil 122 or 124 responds to input current from the power circuit (e.g. position control circuit or other suitable electrical input as described herein). As such input wiring is desirable. The input wiring and terminals for the 122 version of the voice coil is shown at 150. The input wiring and terminals for the 124 version of the voice coil is shown at 151 and includes windings 152 to accommodate extension and contraction of the throughput wires 152 during operation of the valve assembly 511.

The valve assembly 511 is shown in a closed or downward 156, position. As such, piston 116 fully obstructs orifices 114 thereby preventing fluid from flowing from damper assembly 630, through channel 636, into upper chamber 153, through orifice 114, through valve outlet 157 and into floating piston compensator chamber 154. When current of an appropriate magnitude is applied to the voice coil 122 or 124, the magnet electromagnet combination of 122 and 124 causes the back iron 126, and correspondingly the valve piston 116, to move upward 155 in an amount proportional to the voice coil input. Such upward 155 movement is against spring 118, which biases the valve piston 116 downward 156 (i.e. toward closed), and therefore when the voice coil input balances with the force of spring 118, movement of the piston 116 will stop and the valve assembly 511 will be correspondingly throttled.

In operation, the sensor 5 (and/or sensors 5b, 5c, 35) puts out a voltage change corresponding to an input force (for example the outputs from both sensors 5, 5b, 5c, 35 may be reconciled in a controller or processor 65 (described in greater detail below), such as a microprocessor, having an algorithm for weighting their respective inputs and generating a resulting singular command or signal based on a predetermined logic). In one embodiment the sensor 5 senses an input force along the prescribed range or axis 20. A bump in the terrain 45 typically exerts a force 55 on a tire/wheel 60 of the bicycle 100. The angle of the resolved force 55 relative to the tire/wheel 60 is typically normal (substantially) to the tire/wheel 60 at the point of impact. That force 55 then imparts a component of the impact 55 to the axle 15 as dictated by the trajectory of the swing arm linkage 10. That component can be sensed by the sensor 5 at a magnitude corresponding to the orientation of the sensor range or angle 20. The sensor axis orientation can be adjusted to make the sensor 5 more or less sensitive (by imparting more or less of the impact 55 to the sensor range or axis 20) to bumps and dips in the terrain.

It is envisaged that there are various ways the remote lock/unlock function of the rear shock absorber 25 and/or front shock absorber 80 may be provided on the bicycle 100. In one embodiment, remote lock/unlock may be entirely automatically controlled by a controller 65 in response to the input from the sensors 5, 5b, 5c and/or 35 when the bicycle 100 is in use. Optionally, the user may be able to override and/or adjust this automatic control using a device 50. In one embodiment, the remote lock/unlock of the rear shock absorber 25 and/or front shock absorber 80 may be entirely controlled at the user's discretion using the device 50; in such an embodiment the sensors 5, 5b, 5c and/or 35 need not be provided on the bicycle 100 and the user locks and unlocks the suspension system according to his or her own preferences at the time.

Figure 3:
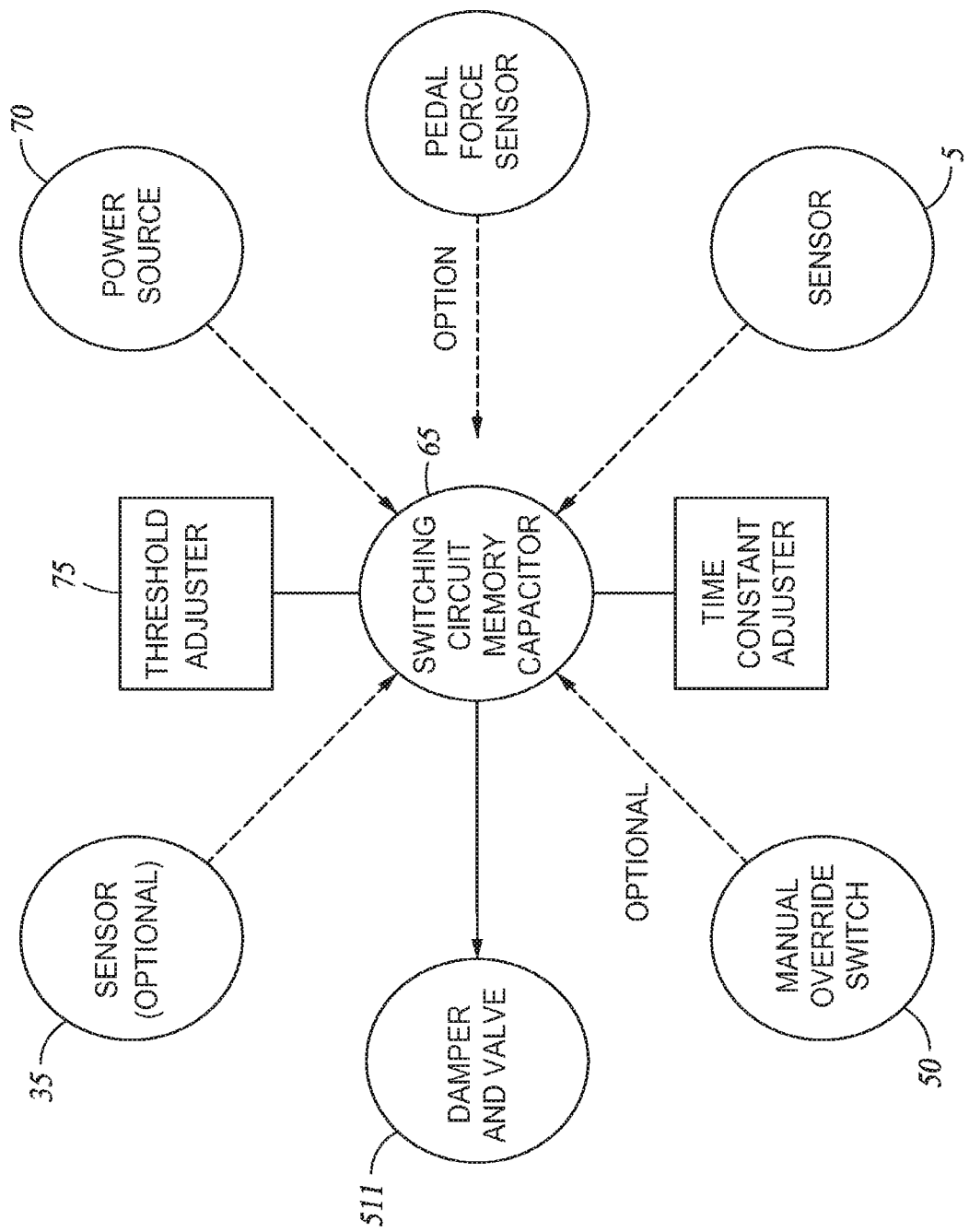
FIG. 3 illustrates a schematic block diagram of components of one embodiment of an electric lock out apparatus.

Referring to FIG. 3 herein, when the sensor 5 puts out a voltage corresponding to a bump (and/or optionally a dip) that voltage is transmitted to a controller 65 (e.g. comprising a memory and a processor/microprocessor, or an ASIC). In one embodiment the shock absorber 25, including damper assembly 630, intensifier assembly 510, and/or valve assembly 511 (shown in FIGS. 1, 2A, and 2B) is responsive to signals and power transmitted from the controller or processor 65. The valve assembly 511 is default in the closed position and will throttle open corresponding to power input received at terminals 150. The processor or controller 65 compares the output voltage of sensor 5 to a preset (by means of threshold adjuster 75 such as, for example, a potentiometer) value and if that value is exceeded, the controller routes a predetermined amount of power from the power source 70 (e.g. suitable battery, capacitor, photovoltaic generator or other suitable mechanism or combination thereof) to the valve assembly 511. Optionally the controller 65 compares the output voltage to a magnitude comparator value over time (the time constant is also user adjustable). In that option the magnitude of the output voltage must remain above a given threshold value for a predetermined amount of time before the controller 65 will route power to the valve assembly 511. When the output voltage falls below the threshold value, power to the valve assembly 511 is shut off. Optionally, the controller 65 may taper power off over a selectable period of time as part of the shut off function. Optionally, multiple threshold values may be set in the controller 65. At each threshold value may direct a differing amount of power from the source 70 to the valve assembly 511. If, for example, only a lower threshold is met, the controller 65 may direct an amount of power only corresponding to a partial opening of the valve assembly 511. If a higher threshold is met the directed amount of power may correspond to a full open valve assembly 511. Multiple time constants may also (independently or additionally) be preset for different corresponding valve assembly 511 function levels. Optionally the valve assembly 511 may be of a type described in U.S. Pat. No. 6,073,736. Optionally, the valve control/power circuit may be configured and operable in a manner such as disclosed in U.S. Pat. Nos. 5,971,116 and 6,073,736 each of which is herein incorporated, in its entirety, by reference, or by any other means or method disclosed herein or any suitable combinations or portions thereof.

In one embodiment, a device 50 is provided in a location convenient for user manipulation during vehicle operation. In one embodiment, the device 50 may be a manual lock out (or unlock or both) switch. In one embodiment, the device 50 is provided on the handlebar of the bicycle 100 (or other part of the bicycle 100 that is reachable during use). Optionally the device 50 includes the functions of locking and unlocking valve assembly 511, adjusting threshold(s) 75 and adjusting time constant(s) all as shown in FIG. 3. Thus at its simplest, the device 50, such as a manually operated button, trigger or lever, allows the user to remotely lock/unlock the rear shock absorber 25 (and/or the front shock 80) at will. The device 50 may cause both front and rear shocks to lock/unlock together, or it may permit the user to lock/unlock each shock independently.

In one embodiment, the device 50 comprises a lever that is shiftable by the user of the vehicle 100. The lever may shift between first and second positions (each corresponding to a "lock" and "unlock" command to the damping assembly). Alternatively, the lever may move away from a first position and then return to that position having switched between locked and unlocked during the movement; such movement may be similar to the way indexed (e.g. ratcheted) gear shifters operate.

In one embodiment, the device 50 comprises a digital user interface device provided with buttons and/or a touch screen enabling the user to lock and unlock the damping assembly at will. The device 50 may comprise a suitable GPS unit, bicycle computer, heart rate monitor, smart phone, personal computer, cloud connected computer and may further comprise connectivity to the internet. The device 50 may send and receive data via cell phone bands, satellite bands or other suitable electromagnetic frequencies to connect with other computer networks for the sending and or receiving of data wherein the data may be received by and transformed by an outside computing machine and transmitted to the device 50 in an altered form or in a new form corresponding to the result of the outside machine transformation. The functionality of the device 50 may be incorporated into performance recording devices and/or digital user interfaces, such as, but not limited to, the GARMIN EDGE series of devices, and smart phones such as the Apple iPhone or Motorola with Droid.

In one embodiment, the device 50 may provide additional functionality to enable to user to remotely control the rear and/or front shock more finely. For example, the device 50 may permit the user to remotely set a shock (i.e. the amount that the valve assembly 511 is open/closed) at one of a number of predefined (e.g. indexed) positions in transition between locked and unlocked, or may permit the user set the shock at substantially any ("infinite" or "continuous" adjustment) position between those two limits. For example the position of the valve assembly 511 may correspond with a position of an indicator on the device 50. The indicator may be a visual indication (e.g. digital or graphical indicator), or a physical indicator (e.g. position of a lever between two limit positions).

The default or pre-biased position of the valve assembly 511 may be either open or closed, or somewhere in between. In one embodiment, the valve assembly 511 is default set open. In one embodiment, the actuator portion 120 moves the valve portion 110 in one direction from its default or bias and it returns to bias by means of the spring 118 or other suitable biasing mechanism when the actuator portion 120 ceases to function. Controller or processor 65 monitors sensor 5 and/or 35 and after a time period of input corresponding to below threshold sensor output the controller 65 directs power to valve assembly 511 sufficient to close the valve portion 110 (the electromagnetic or voice coil being reversed by power input and the spring 118 set as a tensile spring to hold the valve portion 110 open by default). Optionally (or independently and absent the sensors 5 and 35) the device 50 communicates a signal to the controller 65 and the controller 65 correspondingly directs power from source 70 to the valve assembly 511 thereby closing the valve assembly 511 completely or partially as desired. Optionally, a rider of the bicycle 100 may manipulate the device 50 to cause the valve assembly 511 to close, to open, to throttle at intermediate positions, as desired while operating the bicycle 100 on varying terrain (to eliminate pedal bob or maximize ride comfort or traction).

Some or all of components of embodiments herein including sensors and switches, processor or controller 65, shock absorber 25, intensifier assembly 510, and/or valve assembly 511 at terminals 150 or 151, may be interconnected or connected by wire 30, wireless, WAN, LAN, Bluetooth, Wi-Fi, ANT (i.e. GARMIN low power usage protocol), or any suitable power or signal transmitting mechanism. It is particularly desirable in certain embodiments that the device 50 communicate wirelessly with the controller 65. An output electric signal from the device 50 is transmitted to the controller 65. The controller 65 responds to that signal by adjusting the damping rate of the damping assembly 630 to lock or unlock, and/or set at some intermediate level according to the output electric signal.

In one embodiment, the shock absorber 25, including damper assembly 630, intensifier assembly 510, and/or valve assembly 511, further operates with mechanically variable damping and/or spring features when the valve assembly 511 is open or partially open. In one embodiment, the valve assembly 511 is positioned in series with the "adjustable intensifier assembly" 510 valve of U.S. Pat. No. 7,374,028 so that fluid must traverse both valves between the damper channel 636 and the compensator chamber 154. In operation, the damping function of the shock absorber 25 is consistent with the operation of the intensifier assembly 510 when the valve assembly 511 is open. Other mechanical shock absorber functions may also be integrated with the present disclosure such that the shock absorber 25 is highly versatile and functional when valve assembly 511 is open. Such features are disclosed for example in U.S. Provisional Patent Application Ser. No. 61/157,541, and any individual or combination of features disclosed therein is suitable for combination with embodiments of this present disclosure. In one embodiment of operation, it is desirable to have the features of a highly versatile yet robust mechanically adjustable shock absorber in combination with the electric lock out presently disclosed.

In one embodiment, the controller 65 takes a derivative (differentiation) of the acceleration to determine the rate of change of acceleration for forecasting and implementing adjustment of valve assembly 511 (rebound issue is a big deal) or for determining a data rate or density required to adequately represent current suspension behavior (to for example to cull high rate raw data into more manageable yet representative data streams or sets). For example, if a bump is encountered followed immediately by a dip, it may be desirable to have the rebound of the tire into the dip (terrain following for traction advantage) occur very rapidly. If the valve assembly 511 were opened to an intermediate state as determined by the controller 65, for the bump an immediately following large magnitude reversal of the derivative of the acceleration (as input from the sensor 5) may indicate that the controller 65 direct the power source to full opening of the valve assembly 511 to allow maximum rebound velocity. The controller 65 may also compare input from sensors 5 and 35 to determine optimum setting position for the valve assembly 511. For example, if input from sensor 35 is relatively low in magnitude the controller 65 may open the valve assembly 511 gradually until some increase in sensor 35 is noted and then close the valve assembly 511 back slightly from that. In one embodiment, if input from sensor 35 is consistent in frequency with input from a pedal force sensor (e.g. U.S. Pat. No. 5,027,303 which is incorporated herein by reference), the controller 65 may direct a closure of the valve assembly 511 until such synchronization is eliminated or reduced.

It is noted that embodiments herein of shock absorber 25 and related systems are equally applicable to the vehicle, such as bicycle 100, front forks 80. Further, it is contemplated that the bicycle 100 may include both shock absorber 25 and forks 80, both of which having some or all of the features disclosed herein.

Figure 4:
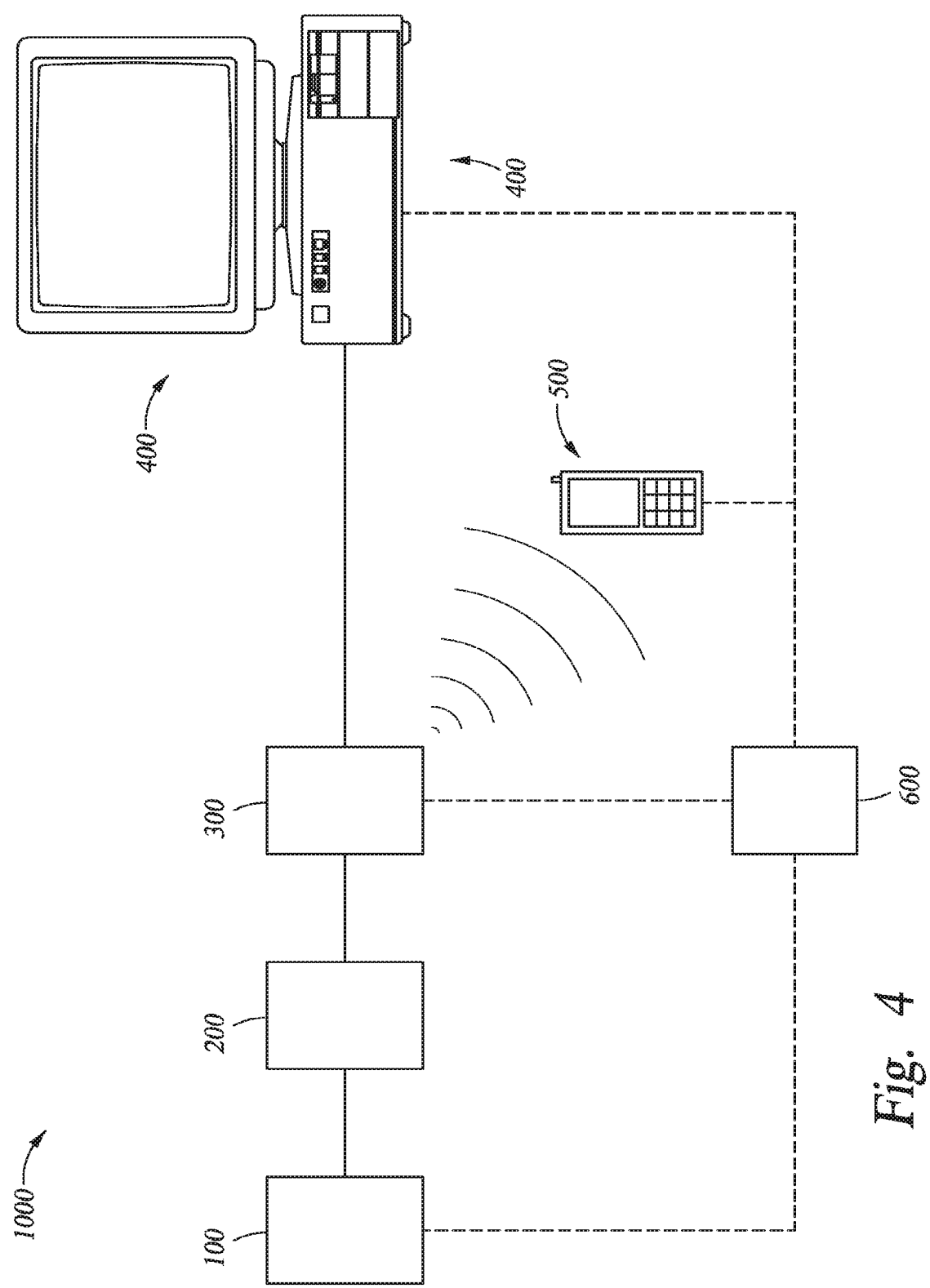
FIG. 4 illustrates a block diagram of a system according to one embodiment.

FIG. 4 illustrates a system 1000 according to one embodiment. The system 1000 may include a vehicle 100 (such as vehicle 100 described above), one or more sensors 200 (such as sensors 5, 5b, 5c, 35 described above), a processor or controller 300 (such as processor or controller 65 described above), a computer system 400, and a communication device 500 (such as device 50 described above). An operator or user 600, such as a rider of the vehicle 100, may use the system 1000 according to the embodiments described herein. In one embodiment the vehicle 100, such as a bicycle, is equipped with the processor 300, such as a suspension setup microcomputer device comprising at least one memory, program having an algorithm and computer for executing the program, which captures data in the memory from the sensors 200 that are coupled to one or more vehicle 100 suspension components (such as a fork and rear shock on a bicycle or motorcycle). The data may include suspension component relative position data (e.g. inches of compression or full extension or full compression or any suitable combination of such data) and/or other operational characteristics/features of the vehicle 100 that are measured by the sensors 200. The data may be communicated to the controller 300 via wired and/or wireless communication, and the controller 300 may process the data and communicate the data via for example an industry standard, low power wireless protocol to the communication device 500, such as an external 3rd party device with a display, to instruct the user 600 on what adjustments to make to improve the vehicle 100 suspension setup and/or to describe the current performance of the vehicle 100 suspension system. In one embodiment, the user 600 may use the computer system 400 and/or the communication device 500 to adjust one or more components of the vehicle 100, automatically, manually and/or remotely, wired and/or wirelessly, directly, manually and/or indirectly (such as via the controller 300) during and/or after operation of the vehicle 100.

In one embodiment, the sensor 200 is mounted to a vehicle suspension component, such as front forks 80 of bicycle 100 illustrated in FIG. 1. The sensor 200 may be coupled to the vehicle 100 and may be operable to measure an operational characteristic of a vehicle component, such as the vehicle suspension. In one embodiment, the sensor 200 may be directly coupled to the vehicle component for direct measurement of that component's operational characteristics. In one embodiment, the sensor 200 may be coupled to a portion of the vehicle 100 apart from the vehicle component and may be operable for indirect measurement of that component's operational characteristics. In one embodiment, the sensor 200 may be positioned at any location relative to the vehicle 100 and may be operable to measure an operational characteristic of the vehicle 100 directly or indirectly (e.g. inferred from the position of a vehicle component, such as the position of the vehicle suspension linkage, or the sprung versus un-sprung portion of the vehicle component for example. The sensor 200 is used to determine the position, velocity, and/or acceleration of the suspension component (raw sensor data is used to calculate such parameters within the processor). The sensor 200 may be a linear potentiometer, a string potentiometer, a contact or non-contact membrane potentiometer, a rotary potentiometer (such as if used on a linkage fork or a rear suspension linkage), an accelerometer or accelerometers, a 3D global position sensor ("GPS"), a pressure sensor (for measuring the air spring or coil spring compression), and/or other type of sensor from which a damper assembly position of the vehicle 100 can be determined.

These sensors 200 may communicate either wired or wirelessly to the controller 300, such as a microcomputer device, to communicate the sag position or any other suitable data. Due to potentially high sampling rate requirements associated with suspension movement and power considerations (e.g. economy), it is preferable at this time to communicate from the vehicle suspension sensors 200 to the controller 300 via one or more wires (which can for example carry more data than wireless), including electrical and fiber optical wires, for example. It is expected that in the future wireless protocols and battery life may be such that wireless high speed communication (although possible today) between the sensors 200 and the controller 300 will become more practical and is therefore contemplated hereby. In one embodiment, the data sampling rate is about 500 Hz to allow sufficient sampling and resolution of the vehicle suspension movement during operation.

In one embodiment, the controller 300 is relatively small (about 2".times.3-3.5".times.0.5-0.625") and lightweight so as to not negatively impact the user 600 of the vehicle 100. In one embodiment the controller 300 need not literally "control" anything but rather may cull data and send the result to the device 50 or 500. In one embodiment, the controller 300 may contain one or more of the following major components: a low power microprocessor, a wireless communication chip (such as ANT+, Bluetooth, and/or Wi-Fi 802.11 n), a battery, and flash memory. The controller 300 may also have other sensors on board such as a GPS, a compass, an accelerometer, an altimeter, and/or an air temperature sensor. The controller 300 may also have one or more external features such as multi-color LED's to communicate basic state of operation and battery charge to the user 600, and buttons to toggle power and start/stop data logging. The controller 300 may also have an external mini USB connector to connect to a computer, such as the computer system 400, for uploading of data and charging the battery. The controller 300 may also have external connectors to connect to any wired sensors 200.

In one embodiment, the controller 300 (such as a computer or a microcomputer) may record and evaluate the typically high frequency vehicle 100 suspension data in real time. The controller 300 may analyze parameters like sag (static ride height), rebound and compression speed, top out and bottom out events. Then, after analysis is complete, the controller 300 may communicate to the communication device 500, such as an external 3.sup.rd party user interface device (e.g. 50 or 500), via an industry-standard, lower power wireless communication protocol in simple and small data packets at about 1 Hz to about 10 Hz. Because there are many user interface devices that already have ANT+ and/or Bluetooth built in (e.g. Garmin GPS, power meters, iPhone and iPod, etc.) it is contemplated that certain embodiments hereof will be so compatible. These interface devices generally have large displays with a developed GUI and user navigation method via any or all of buttons, joystick, touch screen, etc. The built in wireless capabilities are ideal for low density data transmittal, but are not well suited for high speed data acquisition (because low power wireless data rates are generally limited). By leveraging the existing device (e.g. 500) display and GUI capabilities, the applicability of the system is increased. In one embodiment the device 500 is programmed with a data template or templates suitable for filling with data and/or calculations/suggestions from the controller 300. In one embodiment the device 500 is programmed with input templates for facilitating user input of suspension model, user weight, vehicle type, etc. as may be useful in aiding the controller to look up corresponding parameters. The controller 300 will communicate to the communication device 500 selected data or calculations (e.g. graphical, tabular, textual or other suitable format) to display to the user 600, such as suggestions for adjusting spring preload, air spring pressure (to adjust sag), rebound damping setting, compression damping setting, bottom out damper setting, etc. Communication will also work in reverse to allow the user 600 to enter data, such as model of suspension, rider weight, etc., in the communication device 500 which will relay the information to the controller 300. From such model information the controller 300 will look up model relevant parameters and use those to aid in calculating suggestions.

In one embodiment, the controller 300 functions as a data receiver, processor, memory and data filter. The controller 300 receives high frequency (high sampling rate) data from the suspension sensor(s) 200. Because current user interface devices, particularly those using wireless protocol, may not be capable of high enough data rates to directly monitor the suspension sensors 200, the controller may act as a high data rate intermediary between the suspension sensors 200 and the communication device 500. In one embodiment, the controller 300 is configured to prompt and accept high sampling rate data from the suspension sensors 200. The controller 300 then stores the data and processes selected data at selected intervals for transmission to a user interface of the communication device 500, for example. In other words the controller 300 pares the effective data rate and makes that pared data transmission to the user interface in real time. Additionally, the controller 300 stores all untransmitted data for later analysis if desired. The controller 300 can later be plugged into the computer system 400, such as a home computing device or laptop via a USB pigtail or dongle device. The controller 300 may also preprocess data and generate user friendly viewing formats for transmission to the user interface of the communication device 500. The controller 300 may calculate data trends of other useful data derivatives for periodic "real time" (effectively real time although not exact) display on the user interface of the communication device 500.

In one embodiment, each vehicle 100 suspension component is equipped with a position sensor 200 for indicating the magnitude (or state) of extension or compression existing in the vehicle 100 suspension at any given moment. As the suspension is used over terrain, such a sensor 200 will generate a tremendous amount of data. Relatively high sampling rates are needed to capture meaningful information in devices operating at such high frequencies. In one embodiment, a suitable telescopic tube of the vehicle 100 suspension is equipped or fitted with two piezoelectric sensors 200. In one embodiment, one of the piezoelectric sensors 200 is a high frequency exciter which is configured on the tube such that it (substantially) continuously induces impacts to a wall of the tube. In lay terms, the sensor 200 thumps or pings the tube wall on a continual basis. In one embodiment, the second piezoelectric sensor 200 is an accelerometer fixed or configured with the tube wall so as to monitor vibration of the tube wall. In one embodiment, the exciter and the monitor are vibration ally isolated so as not to directly influence each other. In one embodiment, the frequency of the exciter is intentionally set well outside any resonant mode of the suspension tube as it travels through its operational suspension stroke. In one embodiment, a sensing frequency of the monitor is selected to coincide (substantially) with at least one resonant mode range of the tube as it travels through its operational stroke.

In one embodiment, the aforementioned exciter and monitor are calibrated, in conjunction with the controller 300, so that values for resonant frequencies (in a selected mode or modes) of the suspension tube (or other suitable and variably "ringing" suspension component) are correlated with axial extension/compression of the suspension containing or including the tube. Such correlation data is stored with the controller 300 for use in real time calculation of axial suspension position based on real time input from the suspension resonant frequency monitor. The tube will tend to resonate regardless of the exciter frequency so by monitoring the change in resonant frequency or tube "ringing", with the monitor, the axial position of the suspension can be derived within the controller 300.

In one embodiment, the exciter and monitor act on and measure resonance with a cavity of the vehicle 100 suspension wherein cavity resonance versus axial suspension displacement is calibrated and correlated for use in the controller 300. In one embodiment, magnetic flux leakage of a suspension component, or magnetic imposition of current in a surrounding conductive structure, is correlated with axial suspension displacement. In one embodiment, optics are used (e.g. Doppler effect). In one embodiment, a magnet is affixed to one portion of the suspension and a conductor is affixed to a relatively movable portion of the suspension so that when the suspension moves axially the relative movement between the magnet and the conductor generates a changing current of flux in the arrangement (and that can be correlated with axial movement). In one embodiment, sonic or ultrasonic waves are used to excite a portion of the suspension and the changing reflective sonic signals are monitored to determine axial disposition of the suspension.

In one embodiment, vehicle 100 suspension components include scan compatible identification codes specifying at least model type and possibly including details including performance specifications (also including manufacture details such as lot, factory source, build date, inventory numbers, invoice or tracking numbers, subassembly/assembly numbers, etc). In one embodiment, the codes and/or data are included on a chip embedded in the suspension. In one embodiment, the chip is an active or passive radio frequency identification ("RFID") (optionally including data) chip. In one embodiment, the controller 300 detects the chip and based on the data received there from proceeds to configure, or suggest configuration for, the suspension.

In one embodiment, the controller 300 operates in set up mode where it uses rider input weight and suspension product data to suggest initial spring preload and damper settings for the vehicle 100 suspension. In one embodiment, the controller 300 operates in a ride mode wherein it monitors suspension movement (e.g. average travel used versus available, portion or range of travel used, number and severity of bottom out or top out events) and then uses that data in conjunction with the rider and suspension data to suggest changes to the suspension set up that better utilize or maximize usage of the suspension capabilities. In one embodiment the controller monitors compression range of the suspension to determine whether or not the suspension is set up for optimal use of its range over a given terrain. Too many top out events or bottom out events or operation generally over only a portion of the available range will indicate a possibly needed adjustment to the spring pressure and/or damping rate and the controller 300, upon calculating such range usage sends an appropriate suggestion to the device 500. In one embodiment a GPS unit of, for example the device, transmits real time GPS data to the controller 300 and such data is overlayed or paired with corresponding suspension data along an elapsed (or relative sequence) time (or other suitable common data marker or "datum" type) synchronous data marker.

In one embodiment, rebound setting can be automatically achieved by utilizing the air spring pressure or coil spring preload needed to achieve proper sag. The rebound setting is then achieved via feeding the air spring pressure for an air shock, or an oil pressure signal for a coil shock, down the damper shaft to a pressure sensitive damping valve at the damper shaft piston. There would still be an external rebound adjustor to make incremental changes from the predetermined setting to account for varied terrain/conditions, and/or riding style and preference.

In one embodiment, initial sag can be automatically set and facilitated by having a position valve within the shock for a given length bleed off air pressure until a specific sag level is achieved. Each shock stroke would have a specific length of sag/position valve. The user 600 would pressurize their shock to a maximum shock pressure of, for example, 300 psi or so. The actual max number is not important at this point. The idea is to over pressurize the shock beyond any reasonable properly set sag pressure. The user 600 then switches the shock to be in setup or sag mode. The user 600 then sits on the bike. In one embodiment, the shock will bleed air from the air spring until the position valve encounters a shut off abutment which thereby shuts the bleed valve. In one embodiment, the shock, having an axial position sensor 200 and a controller 300, to measure that compression of the shock from full extension (or any selected set "zero" position datum), "knows" it is extended beyond a proper sag level and a an electrically actuated valve is opened to bleed air pressure from the air spring in a controlled manner until the proper predetermined sag level is reached, at which point the valve automatically closes and the shock opts itself out of sag mode. Alternatively, the user 600 can switch the sag set up mode off upon reaching a proper sag setting. In one embodiment, with the controller 300 in normal ride mode the user 600/vehicle 100 will now be in a proper starting point for their sag measurement. When in riding mode, more pressure can be added to the air spring or pressure can be reduced from the air spring to accommodate different rider styles and or terrain. This auto sag feature can be achieved electronically as well, by having a position sensor 200 in the shock, and the shock model data allowing the controller 300 to adjust spring preload (e.g. air pressure) appropriately for the given model (as determined by the controller 300 in a query) what sag measurement it should achieve. An electronically controlled pressure relief valve is utilized to bleed off air spring pressure until the sensor 200 determines the shock is at its' proper sag. The pressure relief valve is then directed to close. Proper sag is achieved.

In one embodiment, the system 1000 can be utilized by integrating certain data collection sensors 200 to both aid in initial set up and to provide hints on how to tweak the vehicle 100 suspension system beyond an initial set up. At least position sensors 200 would be incorporated into the shock or the fork. The sensors 200 communicate with the controller 300. In one embodiment, the sensor 200/controller 300 interface would be wireless. A wired connection would still be acceptable. Data (e.g. model, specifications) corresponding to all possible suspension products that may interface with the controller 300 would be stored in the controller 300 so when one or another of those products is plugged in, or booted up if wirelessly connected, the controller 300 would know lengths, travels, external adjustment features etc. For that/those products the controller 300 would then walk the user 600 through a proper set up routine, starting with sag for example. The user 600 would sit on the bike and the rider sag measurement for the fork and shock would be displayed on the communication device 500 for example. The controller 300 will know what product it is trying to get adjusted properly and will make pressure recommendations for the user 600 to input to the shock or fork. The user 600 will then sit on the bike again, and in this iterative and interactive process, arrive at a perfect sag setting for the fork and shock product being used. In a more elaborate system, the controller 300 will "know" what pressure is in the fork and shock, and will make rebound recommendations based on those settings. In a simpler form, the controller 300 will ask the user 600 to input their final sag attaining pressures and will then make rebound recommendations based on the product and pressures. The controller 300 will also make compression damping setting recommendations based on the product it knows it is communicating with. The user 600 will then go out and ride the product. The controller 300 will transfer to data logging mode once the bike is being ridden or in a simpler form when the user 600 puts the system into ride mode. The controller 300 will log and save bottom out events, average travel used, identify too quick or too slow rebound events, etc. If average travel is more than a specified amount, the controller 300 will make recommendations on settings to have the system hold itself up better in the stroke. If the average travel used in less than a specified amount the controller 300 will make recommendations on settings to utilize more travel. Full travel events will be evaluated versus the average travel used data and make recommendations on how to reduce or increase the amount of full travel events. Computer (PC/laptop) software will be developed so the data logged can be downloaded to the computer system 400 for further evaluation. A website, such as the FOX RACING SHOX website, can be utilized as a place for riders to go to check out settings other riders are using and why, and to provide a way to "geek out" and spend time in a community, such as a FOX RACING SHOX community. In one embodiment, the controller 300 will log ridden hours and will prompt the user 600 to perform certain maintenance operations, and when data is downloaded to the computer system 400, such as a desktop/laptop machine, a link to the service procedure for the particular recommended service will pop up. The link will be to a video guild on how to perform the service, tools needed etc., if a user 600 is at the max of a particular adjustment feature on the closed or open side, the controller 300 will make a recommendation to have a service provider, such as FOX RACING SHOX, re-valve their system to get that particular adjustment feature into the middle of its' range again, and will make recommendations to a service technician, such as a FOX RACING SHOX service tech, on what direction to make the valving changes, etc. A more elaborate system 1000 can incorporate accelerometers, pressure sensors, etc.

The electronically adjustable damping as described herein and in U.S. provisional patent application Ser. No. 61/175,422 may be integrated with the controller 300 and associated features described herein such that in one embodiment the controller 300 calculates needed changes based on sensor 200 input and facilitates those changes to dampers, air springs or other suitably adjustable suspension portions.

In one embodiment, the system 1000 may include one or more of the following features: electric (or electronic) sensor(s) (accelerometer) that senses upward acceleration of the wheel; electric (or electronic) valve(s) that has the same response time or faster as a mechanical (BrassMass) inertia valve fork cartridge; a lightweight, small form factor, fast charging battery that provides 30 hours of ride time (enough to race a 24 hour event); a fixed blow off; and a velocity sensitive shimmed damping.

In one embodiment, the system 1000 may include one or more of the following features: a processor to actively process sensor data and adjust opening of valve accordingly; a wireless communication to vehicle handlebar mounted control console (also rear shock compatible); an adjustable manual mechanical blow-off; an electronic wirelessly adjustable blow-off; an adjustable "g" threshold to open valve; an adjustable "timer" to dose valve; an adjustable low speed bleed (which could be a separate adjustment, or a trim adjustment of the main on-off valve); a program mode where it automatically alters open and closing parameters based on sensor input (for example sensing a rock garden); auto (Inertia sensing)/On (always lockout)/Off (no lockout) modes; a wheel speed sensor that can also dictate how the fork responded; a travel sensor either for bottom out, or discrete travel points (to aid in proper sag); and a data storage.

In one embodiment, the system 1000 may include one or more of the following features: battery charging via base stud with cap (similar to 36/40); all battery/sensing/actuation at bottom of cartridge; manual mechanical rebound adjust on top; on/off and/or auto on/off switch or system; a GPS could be incorporated to program in sections for race courses, either ahead of time, or on the fly for multi lap races (this could even be used for a DH course with a prolonged pedaling section).

Figure 5:
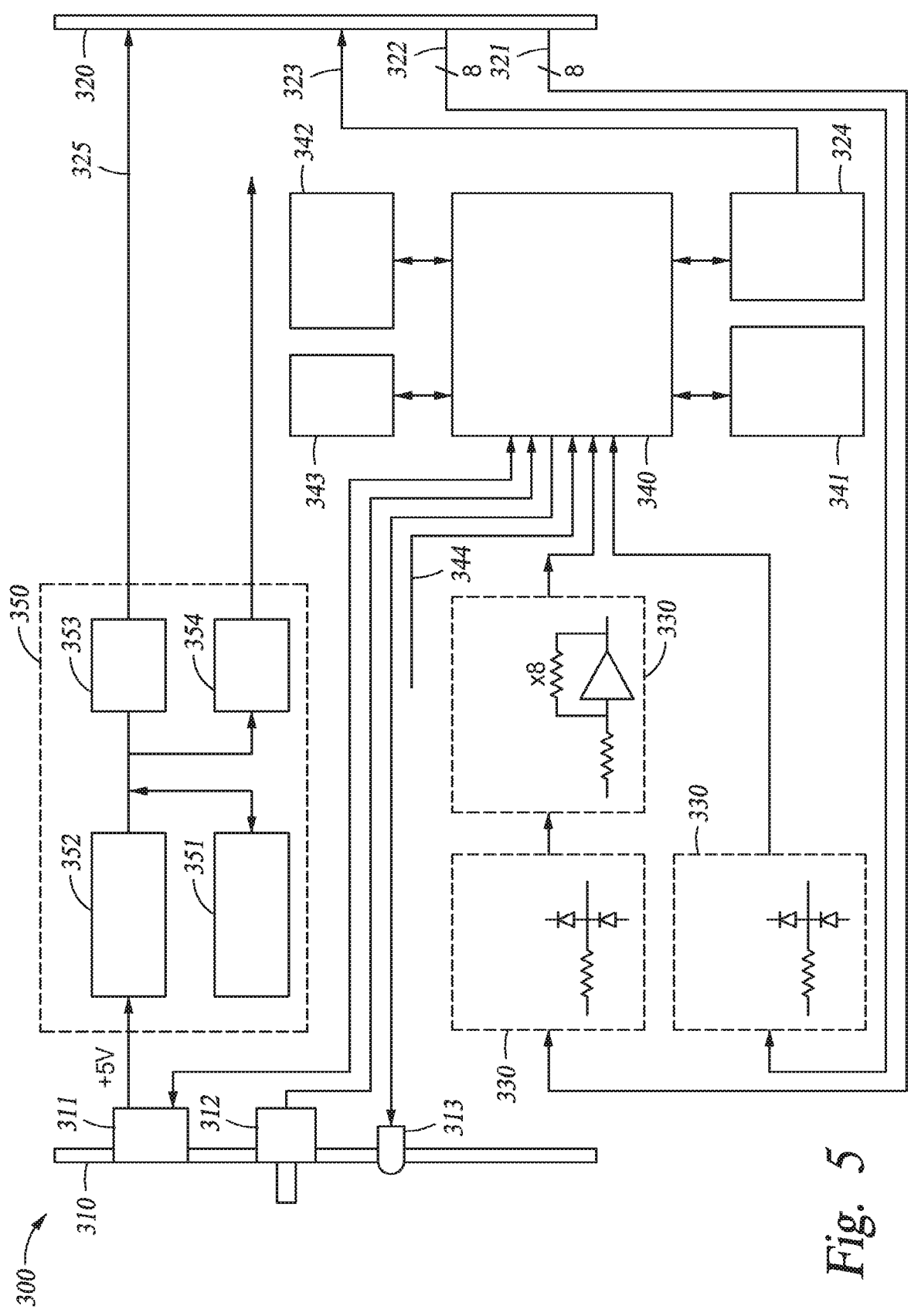
FIG. 5 illustrates a block diagram of a controller of the system according to one embodiment.

FIG. 5 illustrates a block diagram of the controller 300 according to one embodiment. The controller 300 may include a water-proof housing (and shock resistant components or potting) having a front panel 310 and a rear panel 320. The front panel 310 may comprise a connection assembly 311, such as a universal serial bus ("USB") port, for data read-out and/or power or battery charging; a switch 312, such as a momentary contact switch for turning the controller 300 on and off; and an indicator 313, such as a light emitting diode ("LED") for on/off and power or battery status. The rear panel 320 may comprise one or more analog inputs 321, such as eight analog inputs each having 10 bit, 500 Hz SR, and 5V ratio-metric communication features; and one or more digital inputs 322, such as eight digital inputs for communication with Reed/Hall-type switches. The analog and digital sensor signals received by the inputs 322, 321 may be communicated to one or more ESD and/or signal conditioning devices 330. The rear panel 320 may comprise a serial port 323/324 for communication with one or more serial devices, such as GPS and Bluetooth; and a power output 325 for transmitting a 5V and/or 20 mA signal. Each of the components and/or devices in communication with the controller 300 via the front and rear panels may also communicate with a processor 340 of the controller 300.

The processor 340, such as a microprocessor or microcomputer, may communicate with a ANT radio frequency transceiver 343 (e.g. ANT AP2 module, 20.times.20.times.3 mm surface-mount), a memory card socket 342 (for communication with a SD card (2 GB), for example), a debug serial interface 341, and one or more analog inputs 344, such as four analog inputs for self-test including Li-polymer battery voltage, +3.3V logic power supply, +5.0V sensor supply, and internal temperature sensor (e.g. LM34-type). The controller 300 may also include a power system 350 including a battery 351, a battery charger 352, and one or more converters 353, 354, such as voltage converters. In one embodiment, the battery 351 may be a Li-polymer battery with the following features: 850 mA-hr charge, about 36 mm.times.62 mm.times.3.9 mm dimensions, and a 90 minute charge from USB with about an 8-plus hour operating life. In one embodiment, the converter 353 may be a voltage converter operable to provide a +5.0V power signal to one or more sensors in communication with the controller 300. In one embodiment, the converter 354 may be a voltage converter operable to provide a +3.3V power signal to processor 340 and one or more components in communication with the processor. In one embodiment, the components of the controller 300 may provided on a printed circuit assembly size of about 1.6".times.3.0".times.0.3" in dimension, including a 0.062" thick circuit 6-layer circuit board, a 0.200" top-side max component height, and/or a 0.040" bottom-side max component height. In one embodiment, the processor 340 may be configured to send and/or receive one or more signals to and from the other components of the controller 300 for use with the embodiments described herein.

Figure 6:
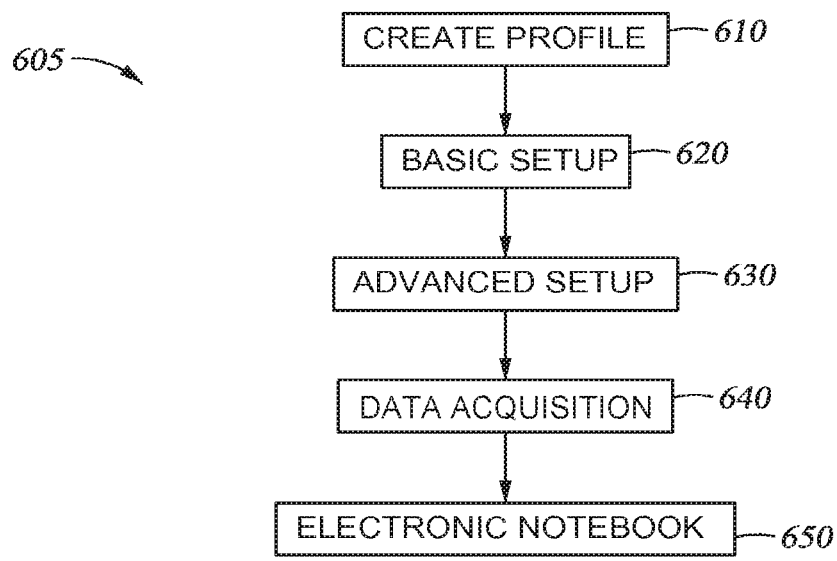
FIG. 6 illustrates a block diagram of a program method for use with the system according to one embodiment.

FIG. 6 illustrates a block diagram of a software program 605 that may be used with the system 1000, according to one embodiment. FIGS. 7-11 illustrate a block diagram example of each step of the software program 605 process. The steps used with the software program 605 may be performed and/or repeated in any order.

Figure 7:
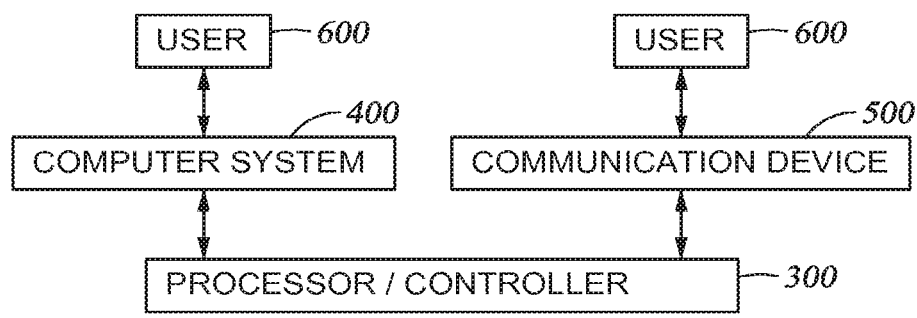
FIGS. 7-11 illustrate examples of the program method steps according to one embodiment.

A first step 610 may include creating a profile. As illustrated in FIG. 7, data about the vehicle 100 and the user 600 may be entered by the user 600 on the computer system 400 (e.g. PC, laptop, etc.) and/or on the communication device 500 (e.g. iPhone, iPod, Garmin, other interface devices, etc.). The computer system 400 may be configured with the full features of the software program, and may include a hard drive to store the vehicle 100 and user 600 data, which data may also be saved to the controller 300. The communication device 500 may include a minimal set of essential questions to be answered by the user 600, the responses to which may be communicated to the controller 300. The data may be stored on the computer system 400 and/or the communication device 500, and may also be sent and stored on the controller 300. The controller 300 may include a storage directory that can transfer and/or receive data from the computer system 400 and/or the communication device 500. Data regarding the basic and advanced setup (further described below) may be stored in the controller 300 in an alternate location on a memory card to be used internally. Several profiles can be stored on the controller 300 for use with different vehicles 100. The computer system 400 and/or communication device 500 can be used to select the profile to activate on the controller 300.

A second step 620 may include setting up basic vehicle 100 parameters. The software program for use with the system 1000 may assist shops and individuals with basic setup parameters of their vehicle 100 components, such as the vehicle suspension. The software program may run on all interface platforms, and may bring the user 600 through a step by step structured procedure to set up the vehicle 100 component based on the data of the vehicle 100 and the user 600 from the profile, as well as specific riding conditions and style anticipated. In one embodiment, the software program may work without the controller 300, but without automatic measurement and some limitations.

Figure 8:
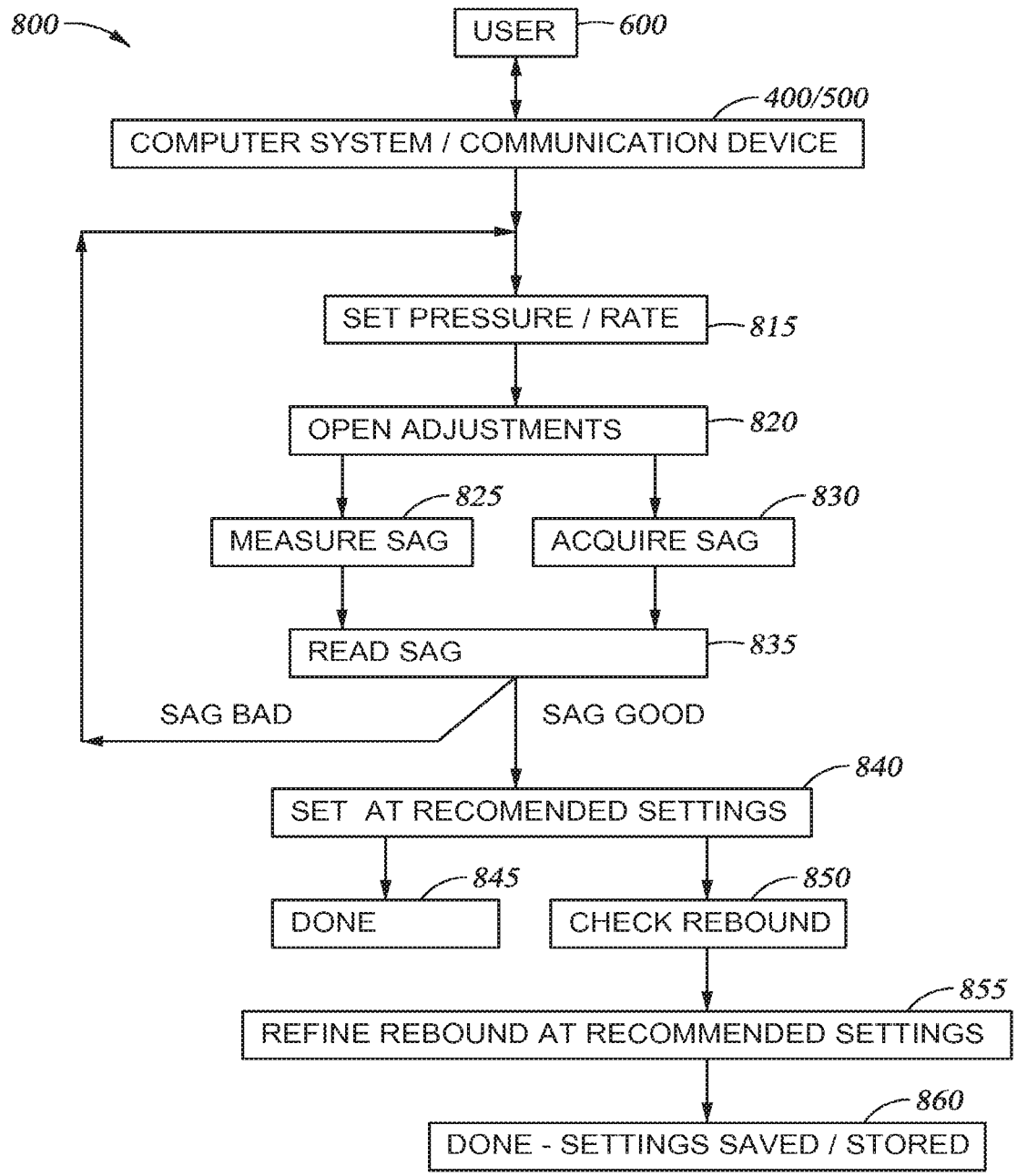

FIG. 8 illustrates a procedural example 800 of the second step 620 used to set up basic vehicle 100 suspension system parameters. In particular, the user 600 communicates with the computer system 400 and/or the communication device 500 as described in the first step 610 to provide user 600 and vehicle 100 data, which the software program may then use to guide the user 600 through a set up procedure. In one embodiment, the data may be manually entered if no controller 300 is present. A first command prompt 815 may instruct the user 600 to set shock absorber pressures and spring rates based on vehicle type, user weight and style. A second command prompt 820 may instruct the user 600 to open the vehicle 100 damper adjustment. If the controller 300 is not available, a third command prompt 825 may instruct the user 600 to get on the vehicle 100, bounce, and measure the sag. If the controller 300 is available, a fourth command prompt 830 may instruct the user 600 to get on the vehicle 100 and bounce, so that the controller 300 can acquire the sag. A fifth command prompt 835 may instruct the user 600 to read the percentage sag, and if the sag is bad, the user 600 may be directed to the first prompt 815 to repeat the procedure. However, if the sag reading is good, then a sixth prompt 840 may instruct the user 600 to set the shock absorber and damper at recommended settings. If the controller 300 is not available, a seventh command prompt 845 may notify the user 600 that the basic set up procedure is complete. If the controller 300 is available, an eighth command prompt 850 may instruct the user 600 to compress the vehicle's 100 front and rear suspension against the ground and then pick the vehicle 100 up off the ground quickly to acquire/check rebound settings. A ninth prompt 855 may instruct the user 600 to refine the rebound to a recommended setting. A final prompt 860 may notify the user 600 that the basic set up procedure is complete and/or that the final set up parameters have been saved and stored.

Figure 9:
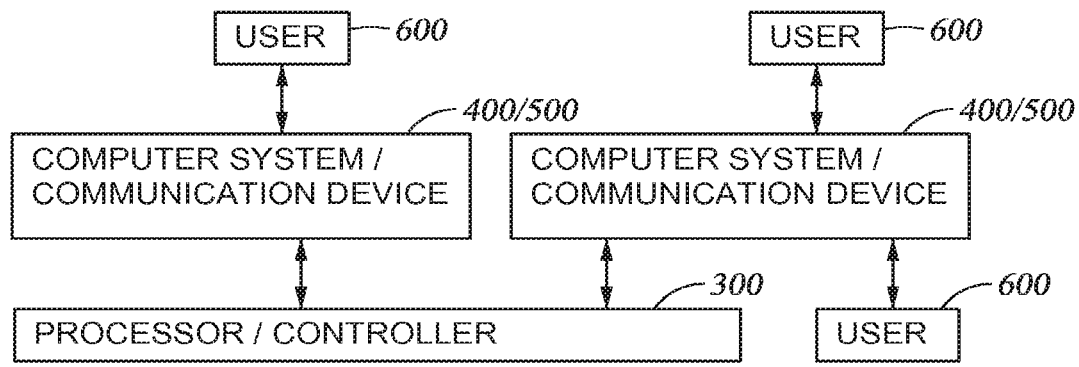

A third step 630 may include setting up advanced vehicle 100 parameters. As illustrated in FIG. 9, the user 600 may set the controller 300 via the computer system 400 and/or communication system 500 into an advanced setup mode where it collects data from the sensors 300 and processes the data. The controller 300 may collect data while riding the vehicle 100 and process the data with parameters from the profile created in the first step 610. In one embodiment, when in the advanced setup mode, the controller 300 collects data from front and rear position, as well as the wheel speed sensors 300 (and any additional sensors that are used) for example during the operation of the vehicle 100. The data is processed to collect significant metrics such as maximum compression and rebound velocities, number of bottom outs, average ride height, and/or pedal bob detection. The data results are updated and stored in an onboard memory device. When connected back to the computer system 400 and/or communication device 500 at the end of the operation of the vehicle 100, a series of questions may be prompted by the controller 300 to the user 600. The questions may be displayed in a fixed format on a user interface or display of the computer system 400 and/or the communication device 500. Based on the answers to the questions provided by the user 600 and the processed data, suggestions will be made to the user 600 as how to further refine the vehicle 100 setup. This is an interactive process so the process can be repeated to continue to develop the vehicle 100 setup.

Figure 10:
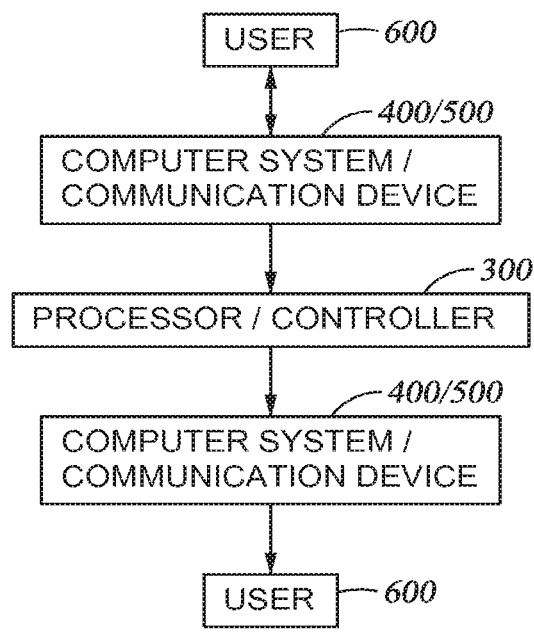

A fourth step 640 may include acquiring data from the sensor(s) 200 about the operation of the vehicle 100. As illustrated in FIG. 10, the user 600 may set the controller 300 via the computer system 400 and/or communication system 500 into a data acquisition mode where it collects and stores raw data from the sensors 300. In one embodiment, when in the data acquisition mode, the controller 300 collects data from front and rear position, as well as the wheel speed sensors 300 (and any additional sensors that are used) for example during the operation of the vehicle 100. The controller 300 may collect the data while riding the vehicle 100 and store the data on the memory card without processing the data. When connected back to the computer system 400 and/or communication device 500 at the end of the operation of the vehicle 100, the data can be downloaded thereto and analyzed. Additional post processing may be performed on the data once downloaded to assist in the analyzing of the data. The computer system 400 and/or communication device 500 can be used to graphically display the data and allow for manipulation, such as through math channels and overlaying data. The software program on the computer system 400 and/or communication device 500 may generate reports, such as histograms of travel, damper speeds, and pedal bob detection. The data acquisition may be thought of as an advanced function, so it is left to the user 600 to interpolate the data and decide on changes to make. An instructional guide may be provided.

Figure 11:
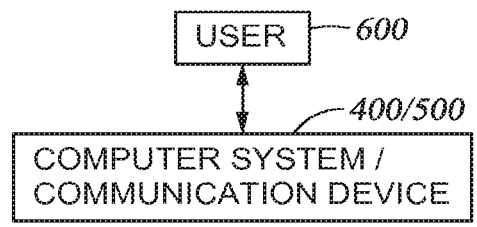

A fifth step 650 may include setting up an electronic file, such as an electronic notebook. As illustrated in FIG. 11, the user 600 may create, edit, and view the electronic notebook using the computer system 400 and/or the communication device 500. The electronic notebook can be used to track vehicle 100 setups and user 600 notes about the vehicle handling, as well as general notes about races, rides, and conditions. Vehicle setups will be able to be saved to the electronic notebook from the profile created in the first step 610 described above. The vehicle setups can be transferred back to the controller 300, the computer system 400, and/or the communication device 500 to run the basic and/or advance set up procedures for different events and/or vehicles. Tracking changes to the vehicle will be one of the key features of the software program so that a history/database of what changes were made to the vehicle 100 and what effect they had will be compiled. The electronic notebook can be searchable so that a symptom can be searched and possible past solutions can be easily found.

In one embodiment, the system 1000 may be used to acquire performance data, including the operation of one or more components of the vehicle 100 and the location of the vehicle 100, during operation of the vehicle 100. The performance data may be associated with a time maker to track the actual time when the performance data was measured. Using the system 1000, the user 600 can utilize the performance data to correlate the actual location of the vehicle 100 at a specific time to a specific operational characteristic of a component of the vehicle 100. In this manner, the user 600 may be able to plot a course over which the vehicle 100 can be operated, and adjust the vehicle 100 components to an optimum setting as the vehicle 100 is operated along the course.

In one embodiment, the user 600 may be able to view the data acquired by the controller 300 during operation of the vehicle 100 via the communication device 500, which may be coupled to the vehicle 100 in any manner for ease of viewing. In one embodiment, the user 600 may be able to view the data acquired by the controller 300 during and/or after operation of the vehicle 100 via the computer system 400 and/or the communication device 500. In one embodiment, the controller 300 may be operable to acquire data from the sensors 200 coupled to the vehicle 100 at predetermined intervals. In one embodiment, the controller 300 may be operable to automatically adjust (increase, decrease, maintain) the intervals at which to acquire data from the sensors 200 based on the operating performance of the components of the vehicle 100.

Figure 12:
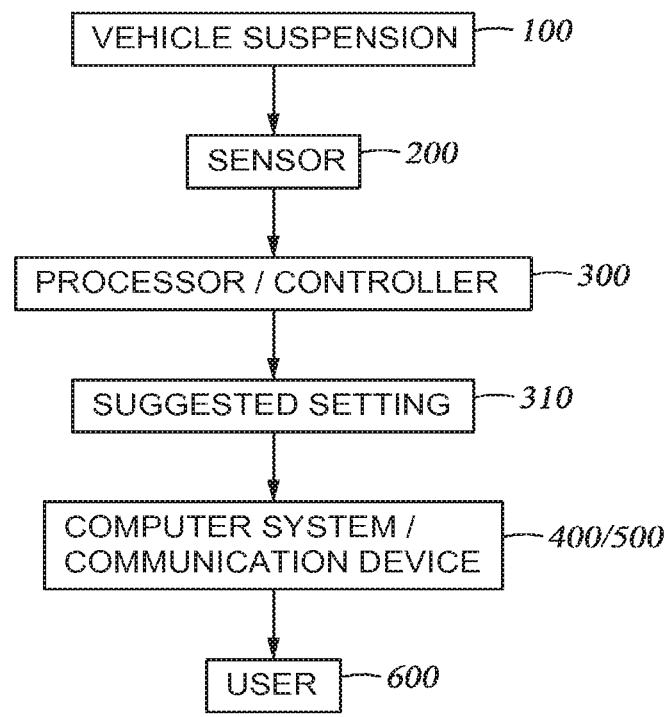
FIG. 12 illustrates a block diagram of a process of use with the system according to one embodiment.

FIG. 12 illustrates a block diagram of one process of use with the system 1000 according to the embodiments described herein. As illustrated, during, prior to, and/or after operation of the vehicle 100, the sensor 200 may measure an operational feature of one or more components of the vehicle 100, such as the travel of the vehicle suspension. The processor or controller 300 may be operable to receive the measurement data from the sensor 200 via wired and/or wireless communication. The processor or controller 300 may analyze the data and compare the data to pre-programmed vehicle suspension operational settings that are stored on the processor or controller 300. Based on the analysis, the processor or controller 300 may output a suggested vehicle setting 310 to the computer system 400 and/or communication device 500 via wired and/or wireless communication. The suggested vehicle setting 310 may be displayed on the computer system 400 and/or communication device 500, and may be in the form of an instruction regarding an adjustable feature of the vehicle 100 suspension and/or a rendition of the measurement data that will aid the user 600 in evaluating the setting of an adjustable feature of the vehicle 100 suspension.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "device," "sensor," "processor," "controller," or "system," such as system 1000. Furthermore, aspects of the invention (such as one or more embodiments of the vehicle 100, the sensor 200, the processor or controller 300, the computer system 400, and/or the communication device 500) may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention (such as one or more embodiments of the vehicle 100, the sensor 200, the processor or controller 300, the computer system 400, and/or the communication device 500) may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks illustrated in one or more of FIGS. 1-12.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks illustrated in one or more of FIGS. 1-12.

In one embodiment, a suspension system may comprise a vehicle suspension, a sensor, a computer readable medium, a processor, a transmitter, and a graphical user interface. The sensor may be positioned to sense a feature of the suspension. The computer readable medium may have an operative communication link with the sensor. The processor may have an operative communication link with the computer readable medium. The transmitter may have an operative communication link with the processor. And the graphical user interface may have an operative communication link with the transmitter.

In one embodiment, a suspension system may comprise a vehicle suspension, a sensor, a processor, a transmitter, and a graphical user interface. The sensor may be positioned to sense a feature of the suspension. The processor may have an operative communication link with the sensor, and an operative communication link with a computer readable medium. The transmitter may have an operative communication link with the processor. And the graphical user interface may have an operative communication link with the transmitter.

In one embodiment, the operative communication link with the sensor comprises a wire. In one embodiment, the operative communication with the transmitter comprises a wireless protocol. The operative communication link with the sensor may transfer information at a first data rate, and the operative communication link with the transmitter may transfer information at a second data rate. The first data rate may be greater than the second data rate. The feature of the suspension may comprise at least one of state of compression, velocity, internal pressure and temperature.

In one embodiment, the computer readable medium stores a first amount of information related to real time performance of the suspension, and the graphical user interface receives a second amount of information related to the suspension performance. The first amount of information may be greater than the second amount of information. At least some of the information related to real time performance may be retrieved by the processor, via the operative communication link with the computer readable medium, and may be transformed by the processor into the information related to the suspension performance. The transmitter may transmit at least some of the information related to the suspension performance to the graphical user interface via the operative communication link with the transmitter. The graphical user interface may include a program for receiving information via the operative communication link with the transmitter. The program may include a template format for the graphical user interface into which format received data may be displayed. The graphical user interface may further process at least some of the information related to the suspension performance and may display a result within the template format. The result may comprise a suggestion to alter a set up condition of the suspension. The result may comprise suspension usage efficiency data that illustrates the adequacy, or lack thereof, of the state of at least one initial set up condition.

In one embodiment, the processor may have an operative communication link with a feature controller of the suspension, and the feature controller may comprise a damping adjuster.

In one embodiment, the processor may comprise a receiver, and the graphical user interface may comprise a GUI transmitter having an operative communication link with the receiver.

In one embodiment, a vehicle suspension system may comprise a first portion having a second portion movably engaged therewith. A sensor may be positioned to measure an operational characteristic of the first portion relative to the second portion. A processor may be in communication with the sensor and may have a program to calculate data representative of the operational characteristic. A user interface may be used for displaying a rendition of the data.

While the foregoing is directed to embodiments of the invention, other and further embodiments of the invention may be implemented without departing from the scope of the invention, and the scope thereof is determined by the claims that follow.

What we claim is:

1. A system for a vehicle, comprising:
   a vehicle suspension having a user-adjustable feature for adjusting performance of the vehicle suspension;
   a sensor comprised of an acceleration transducer, said sensor operable to generate a signal corresponding to the terrain on which said vehicle operates, and to output said signal; and
   a processor in communication with the sensor and operable to receive and process said signal, said processor operable to generate a suggested adjustment of the user-adjustable feature based on the processing of said signal, wherein said suggested adjustment would change the performance of the vehicle suspension, and to output said suggested adjustment for indication to the user, said suggested adjustment in the form of an instruction provided on a vehicle display, said instruction directed to said user regarding an adjustable feature of said vehicle suspension, said instruction provided on said display assisting said user in evaluating an appropriate setting for said vehicle suspension.

2. The system of claim 1, wherein the vehicle suspension includes at least one of a front suspension and a rear suspension of a vehicle.

3. The system of claim 2, wherein the sensor includes a position sensor and the operational characteristic includes a position of the vehicle suspension.

4. The system of claim 1, wherein the sensor includes a position sensor and the operational characteristic includes a position of the vehicle suspension.

5. The system of claim 4, wherein the position of the vehicle suspension corresponds to a stroke of the vehicle suspension during compression or rebound of the vehicle suspension.

6. The system of claim 1 wherein the vehicle suspension includes a damper valve, and the operational characteristic is a position of the damper valve between a full open setting and a full closed setting.

7. The system of claim 1, wherein the processor is in communication with the sensor via at least one of wired communication and wireless communication.

8. The system of claim 1, wherein the sensor is operable to measure a plurality of operational characteristics of the vehicle suspension, wherein the plurality of operational characteristics include position, velocity, and acceleration of the vehicle suspension.

9. The system of claim 1, wherein the sensor includes at least one of a potentiometer, an accelerometer, a GPS, a pressure sensor, and a piezoelectric sensor.

10. The system of claim 1, further comprising:
at least one of a computer system and a communication device, each operable to communicate with the processor and display data corresponding to the operational characteristic measured by the sensor.

11. The system of claim 10, wherein the at least one computer system and communication device includes at least one of a personal desktop computer, a laptop computer, and a hand-held personal computing device.

12. The system of claim 10, wherein the at least one computer system and communication device is operable by the user to make the suggested adjustment to the user-adjustable feature of the vehicle suspension.

13. The system of claim 1, wherein said processor comprises:
a first processor for mounting on said vehicle and operable to receive said signal from said sensor; and
a second processor to be used remote from said first processor and operable to communicate with said first processor, and wherein said first processor is operable to process said signal to generate said suggested adjustment and to communicate said suggested adjustment to said second processor, said first processor operable to communicate data representing at least part of said signal to said second processor.

14. The system of claim 1, wherein said processor and a computer-readable memory are both mountable on a vehicle, said computer-readable memory storing computer-executable instructions that, when executed, cause said processor to:
receive a signal from the sensor corresponding to the operational characteristic of the vehicle suspension;
store at least some of said signal in said computer-readable memory;
process said signal and generate said suggested adjustment, and transmit said suggested adjustment to a remote communication device; and
transmit at least some of said signal to said remote communication device.

15. The system of claim 14, wherein said remote communication device is operable to:
receive said suggested adjustment for indication to a user, or at least some of said signal stored in said computer-readable memory, and then to process said signal and suggest to a user a suggested adjustment of the user-adjustable feature of the vehicle suspension; and
display said signal corresponding to the operational characteristic measured by the sensor.

16. A vehicle comprising:
a vehicle suspension coupled to a wheel of said vehicle, said vehicle suspension having a user-adjustable feature for adjusting performance of the vehicle suspension;
a sensor comprised of an acceleration transducer, said sensor operable to generate a signal corresponding to the terrain on which said vehicle operates, and to output said signal; and
a first processor in communication with the sensor and operable to receive and process said signal, said first processor operable to generate a suggested adjustment of the user-adjustable feature based on the processing of said signal, wherein said suggested adjustment would change the performance of the vehicle suspension, and to output said suggested adjustment for indication to the user, said suggested adjustment assisting said user in evaluating an appropriate setting for said vehicle suspension, said suggested adjustment in the form of an instruction provided on a vehicle display, said instruction directed to said user regarding an adjustable feature of said vehicle suspension, said first processor mounted on said vehicle and operable to receive said signal from said sensor; and
a second processor to be used remote from said first processor and operable to communicate with said first processor, and wherein said first processor is operable to process said signal to generate said suggested adjustment and to communicate said suggested adjustment to said second processor, said first processor operable to communicate data representing at least part of said signal to said second processor.

17. The vehicle of claim 16 wherein said remote communication device is operable to:
receive said suggested adjustment for indication to a user, or at least some of said signal stored in said computer-readable memory, and then to process said signal and suggest to a user a suggested adjustment of the user-adjustable feature of the vehicle suspension; and
display said signal.

18. A system for a vehicle, said system comprising:
a vehicle suspension, wherein said vehicle suspension comprises a vehicle shock absorber, wherein said vehicle shock absorber is mounted between an unsprung portion of said vehicle and a sprung portion of said vehicle and having a user-adjustable feature for adjusting performance of said vehicle shock absorber;
a sensor operable to measure an operational characteristic of said vehicle shock absorber and to output a signal representative of said operational characteristic; and
a processor in communication with said sensor and operable to receive and process said signal, said processor operable to generate a suggested adjustment of said user-adjustable feature based on said processing of said signal, wherein said suggested adjustment would change said performance of said vehicle shock absorber, and to output said suggested adjustment for indication to said user, said suggested adjustment assisting said user in evaluating an appropriate setting for said vehicle suspension, said suggested adjustment in the form of an instruction provided on a vehicle display, said instruction directed to said user regarding an adjustable feature of said vehicle suspension, wherein said system further comprises a communication device operable to communicate with said processor and display data corresponding to said operational characteristic measured by said sensor, and wherein said communication device is operable by said user to make said suggested adjustment to said user-adjustable feature of said vehicle suspension, wherein said vehicle suspension includes a damper valve, and said operational characteristic is a position of said damper valve between a full open and a full closed setting.

* * * * *